United States Patent
Agiwal et al.

(10) Patent No.: US 12,543,240 B2
(45) Date of Patent: Feb. 3, 2026

(54) METHOD AND APPARATUS FOR HANDLING RESPONSE TIMER AND CELL RESELECTION FOR SMALL DATA TRANSMISSION

(71) Applicant: SAMSUNG ELECTRONICS CO., LTD., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 18/005,334

(22) PCT Filed: Jul. 14, 2021

(86) PCT No.: PCT/KR2021/009059
§ 371 (c)(1),
(2) Date: Jan. 12, 2023

(87) PCT Pub. No.: WO2022/015057
PCT Pub. Date: Jan. 20, 2022

(65) Prior Publication Data
US 2023/0284329 A1    Sep. 7, 2023

(30) Foreign Application Priority Data
Jul. 14, 2020  (KR) .................. 10-2020-0086840

(51) Int. Cl.
*H04W 76/27* (2018.01)
*H04W 36/00* (2009.01)
(Continued)

(52) U.S. Cl.
CPC ....... *H04W 76/27* (2018.02); *H04W 36/0072* (2013.01); *H04W 74/0833* (2013.01); *H04W 74/0836* (2024.01); *H04W 74/0838* (2024.01)

(58) Field of Classification Search
CPC . H04W 76/27; H04W 36/0072; H04W 52/02; H04W 76/10; H04W 56/0045;
(Continued)

(56) References Cited

U.S. PATENT DOCUMENTS 10,555,168 B2    2/2020  Mildh et al.
10,986,655 B2    4/2021  Ryoo et al.
(Continued)

FOREIGN PATENT DOCUMENTS

KR    10-2018-0035719 A    4/2018
WO    WO-2018084762 A1 *  5/2018   ........ H04W 72/1268
WO    WO-2020033810 A1 *  2/2020   ........ H04W 36/0079

OTHER PUBLICATIONS

Supplementary European Search Report dated Nov. 8, 2023, in connection with European Patent Application No. 21842088.3, 6 pages.

(Continued)

*Primary Examiner* — Mewale A Ambaye

(57) ABSTRACT

A communication method and system for converging a 5th generation (5G) communication system for supporting higher data rates beyond a 4th generation (4G) system with a technology for Internet of things (IoT) are provided. The communication method and system includes intelligent services based on the 5G communication technology and the IoT-related technology, such as smart home, smart building, smart city, smart car, connected car, health care, digital education, smart retail, security and safety services. A method performed by a terminal for small data transmission (SDT) in a wireless communication system is provided.

12 Claims, 3 Drawing Sheets

(51) Int. Cl.
*H04W 74/0833* (2024.01)
*H04W 74/0836* (2024.01)
*H04W 74/0838* (2024.01)

(58) Field of Classification Search
CPC ............. H04W 74/0836; H04W 76/38; H04W 36/0038; H04W 74/0838; H04W 74/0833
See application file for complete search history.

(56) References Cited

U.S. PATENT DOCUMENTS

| | | |
|---|---|---|
| 2018/0302914 A1 | 10/2018 | da Silva et al. |
| 2020/0100088 A1 | 3/2020 | Kim et al. |
| 2020/0128484 A1 | 4/2020 | Su et al. |
| 2020/0196349 A1 | 6/2020 | He et al. |
| 2021/0410180 A1* | 12/2021 | Tsai ...................... H04L 1/1819 |
| 2022/0039192 A1* | 2/2022 | Palat ................. H04W 12/0431 |
| 2022/0095409 A1* | 3/2022 | Agiwal ................. H04W 76/27 |
| 2023/0328715 A1* | 10/2023 | Agiwal ............. H04W 72/1263 370/329 |
| 2023/0370914 A1* | 11/2023 | Kim ....................... H04W 72/21 |
| 2024/0015689 A1* | 1/2024 | Tseng ................... H04W 4/029 |

OTHER PUBLICATIONS

International Search Report and Written Opinion of the International Searching Authority dated Oct. 14, 2021, in connection with International Application No. PCT/KR2021/009059, 6 pages.
Ericsson, "Updates for R16 LTE Mobility Enhancements and LTE updates for R16 NR Mobility Enhancements", R2-2005757, 3GPP TSG-RAN WG2 Meeting #110-e, Electronic meeting, Jun. 1-12, 2020, 1053 pages.
Office Action issued Apr. 4, 2025, in connection with European Patent Application No. 21 842 088.3, 8 pages.

* cited by examiner

METHOD AND APPARATUS FOR HANDLING RESPONSE TIMER AND CELL RESELECTION FOR SMALL DATA TRANSMISSION

CROSS-REFERENCE TO RELATED APPLICATIONS

This application is a 371 of International Application No. PCT/KR2021/009059 filed on Jul. 14, 2021, which claims priority to Korean Patent Application No. 10-2020-0086840 filed on Jul. 14, 2020, the disclosures of which are herein incorporated by reference in their entirety.

BACKGROUND

1. Field

The disclosure relates to a method for handling a response timer and a cell reselection for small data transmission. More particularly, the disclosure relates to operations upon resumption of radio resource control (RRC) connection for small data transmission in RRC_INACTIVE; handling a timer for connection resumption in RRC_INACTIVE; and handling a cell reselection while small data transmission is ongoing.

2. Description of Related Art

To meet the demand for wireless data traffic which has increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long-term evolution (LTE) System.' The 5G wireless communication system supports not only lower frequency bands, but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving into an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility, etc. However, it is expected that the design of the air-interface of the 5G wireless communication system will be flexible enough to serve user equipments (UEs) having different capabilities depending on the use case and market segment in which a UE caters service to the end customer. Use cases that the 5G wireless communication system is expected to address include enhanced mobile broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time, and on the go. The m-MTC requirements (e.g., very high connection density, infrequent data transmission, very long battery life, low mobility address, and so on) address the market segment representing the IoT/IoE envisioning connectivity of billions of devices. The URLL requirements (e.g., very low latency, very high reliability, variable mobility, and so forth) address the market segment representing the industrial automation application and vehicle-to-vehicle/ vehicle-to-infrastructure communication that is foreseen as one of the enablers for autonomous cars.

In the 5G wireless communication system, RA is supported. RA is used to achieve uplink (UL) time synchronization. RA is used during initial access, handover. RRC connection re-establishment procedures, scheduling request transmissions, small data transmission, SI request, secondary cell group (SCG) addition/modification, beam failure recovery (BFR), and data or control information transmission in UL by a non-synchronized UE in an RRC CONNECTED state. Several types of RA procedures are supported. The RA configuration (e.g., preambles, PRACH occasions, etc.) for performing RA procedure is configured separately for each BWP.

Contention Based RA (CBRA)

This is also referred as 4-step CBRA. In this type of RA, the UE first transmits an RA preamble (also referred as message 1 (Msg1)), and then waits for a random access response (RAR) in the RAR window. The RAR is also referred as message 2 (Msg2). Next generation node B (gNB) transmits the RAR on the physical downlink shared channel (PDSCH). A PDCCH scheduling the PDSCH carrying the RAR is addressed to an RA-radio network temporary identifier (RA-RNTI). The RA-RNTI identifies the time-frequency resource (also referred to as a physical RA channel (PRACH) occasion or a PRACH transmission (TX) occasion or an RA channel (RACH) occasion) in which the RA preamble was detected by the gNB. The RA-RNTI is calculated by Equation 1 as follows:

$$\text{RA-RNTI} = 1 + s\_id + 14 * t\_id + 14 * 80 * f\_id + 14 * 80 * 8 * ul\_carrier\_id \quad [\text{Equation 1}]$$

where s_id is the index of the first orthogonal frequency division multiplexing (OFDM) symbol of the PRACH occasion, where the UE has transmitted Msg1, i.e., the RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$); and ul_carrier_id is the UL carrier used for Msg1 transmission (0 for normal UL (NUL) carrier and 1 for supplementary UL (SUL) carrier. Several RARs for various RA preambles detected by the gNB can be multiplexed in the same RAR media access control (MAC) protocol data unit (PDU) by the gNB. An RAR in a MAC PDU corresponds to a UE's RA preamble transmission if the RAR includes an RA preamble identifier (RAPID) of the RA preamble transmitted by the UE. If the RAR corresponding to its RA preamble transmission is not received during the RAR window and the UE has not yet transmitted the RA preamble for a configurable (e.g., configured by the gNB in a RACH configuration) number of times, the UE returns to the first step, i.e., selects an RA resource (preamble/PRACH occasion) and transmits the RA preamble. A backoff may be applied before returning to the first step.

If the RAR corresponding to the RA preamble transmission is received, the UE transmits a message 3 (Msg3) in a UL grant received in RAR Msg3 includes messages such as an RRC connection request, an RRC connection re-establishment request, an RRC handover confirm, a scheduling request, an SI request, etc. Msg3 may include the UE identity (i.e., a cell-radio network temporary identifier (C-RNTI), a system architecture evolution (SAE)-temporary mobile subscriber identity (S-TMSI), or a random number). After transmitting the Msg3, the UE starts a contention resolution timer. While the contention resolution timer is running, if the UE receives a PDCCH addressed to the C-RNTI included in Msg3, contention resolution is considered successful, a contention resolution timer is stopped, and the RA procedure is completed. While the contention resolution timer is running, if the UE receives a contention resolution MAC control element (CE) including the UE's contention resolution identity (e.g., the first X bits of a common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE returns to the first step, i.e., selects an RA resource (preamble/PRACH occasion) and transmits the RA preamble. A backoff may be applied before returning to the first step.

Contention Free RA (CFRA)

This is also referred to as legacy CFRA or 4-step CFRA. A CFRA procedure is used for scenarios such as handover where low latency is required, timing advance establishment for SCell, etc. An eNB (or gNB) assigns to the UE a dedicated RA preamble. The UE transmits the dedicated RA preamble. The eNB (or gNB) transmits the RAR on a PDSCH addressed to RA-RNTI. The RAR conveys an RA preamble identifier and timing alignment information. The RAR may also include a UL grant. The RAR is transmitted in an RAR window similar to a CBRA procedure. CFRA is considered successfully completed after receiving the RAR including an RAPID of the RA preamble transmitted by the UE. In case RA is initiated for BFR, CFRA is considered successfully completed if PDCCH addressed to C-RNTI is received in a search space for BFR. If the RAR window expires and RA is not successfully completed and the UE has not yet transmitted the RA preamble for a configurable (i.e., configured by the gNB in a RACH configuration) number of times, the UE retransmits the RA preamble.

For certain events such as handover and BFR, if dedicated preamble(s) are assigned to the UE, during the first step of RA procedure, i.e., during RA resource selection for Msg1 transmission, the UE determines whether to transmit the dedicated preamble or a non-dedicated preamble. Dedicated preambles are typically provided for a subset of SSBs/channel state information reference signals (CSI-RSs). If there is no SSB/CSI-RS having DL reference signal received power (RSRP) above a threshold among the SSBs/CSI-RSs for which CFRA resources (i.e., dedicated preambles/PRACH occasions) are provided by the gNB, the UE selects a non-dedicated preamble. Otherwise, the UE selects the dedicated preamble. During the RA procedure, one RA attempt may be CFRA while another RA attempt may be CBRA.

2-Step CBRA

In the first step of 2-step CBRA, the UE transmits an RA preamble on a PRACH and a payload (i.e., MAC PDU) on a PUSCH. The RA preamble and payload transmission is also referred to as message A (MSGA). In the second step, after MSGA transmission, the UE monitors for a response from the network (i.e., from the gNB) within a configured window. The response is also referred as message B (MSGB). If a CCCH SDU was transmitted in the MSGA payload, the UE performs contention resolution using the contention resolution information in MSGB. The contention resolution is successful if the contention resolution identity received in MSGB matches the first 48 bits of the CCCH SDU transmitted in MSGA. If a C-RNTI was transmitted in the MSGA payload, the contention resolution is successful if the UE receives a PDCCH addressed to the C-RNTI. If contention resolution is successful, the RA procedure is considered successfully completed. Instead of contention resolution information corresponding to the transmitted MSGA, MSGB may include fallback information corresponding to the RA preamble transmitted in MSGA. If the fallback information is received, the UE transmits Msg3 and performs contention resolution using Msg4 as in the CBRA procedure. If contention resolution is successful, the RA procedure is considered successfully completed. If contention resolution fails upon fallback (i.e., upon transmitting Msg3), the UE retransmits MSGA. If a configured window in which the UE monitors a network response after transmitting MSGA expires and the UE has not received MSGB including contention resolution information or fallback information as explained above, the UE retransmits MSGA. If the RA procedure is not successfully completed after transmitting MSGA a configurable number of times, the UE fallbacks to the 4-step RA procedure. i.e., the UE only transmits the RA preamble.

An MSGA payload may include one or more of CCCH SDU, a dedicated control channel (DCCH) SDU, a dedicated traffic channel (DTCH) SDU, a buffer status report (BSR) MAC CE, a power headroom report (PHR) MAC CE, SSB information, a C-RNTI MAC CE, or padding. MSGA may include a UE ID (e.g., random ID, S-TMSI, C-RNTI, resume ID, etc.) along with a preamble in the first step. The UE ID may be included in the MAC PDU of MSGA. A UE ID such as C-RNTI may be carried in a MAC CE, wherein the MAC CE is included in a MAC PDU. Other UE IDs (such as random ID, S-TMSI, C-RNTI, resume ID, etc.) may be carried in CCCH SDU. The UE ID can be one of a random ID, S-TMSI, C-RNTI, resume ID, international mobile subscriber identity (IMSI), idle mode ID, inactive mode ID, etc. The UE ID can be different in different scenarios in which the UE performs the RA procedure. When the UE performs RA after power on (e.g., before it is attached to the network), then the UE ID is the random ID. When the UE performs RA in an IDLE state after the UE is attached to network, the UE ID is S-TMSI. If the UE has an assigned C-RNTI (e.g., in a connected state), the UE ID is C-RNTI. In case the UE is in an INACTIVE state, the UE ID is a resume ID. In addition to the UE ID, some additional control information can be sent in MSGA. The control information may be included in the MAC PDU of the MSGA. The control information may include one or more of a connection request indication, a connection resume request indication, an SI request indication, a buffer status indication, beam information (e.g., one or more DL TX beam ID(s) or SSB ID(s)), BFR indication/information, a data indicator, a cell/base station (BS)/transmit-receive point (TRP) switching indication, a connection re-establishment indication, a reconfiguration complete or handover complete message, etc.

2-Step CFRA

In this case, the gNB assigns to the UE a dedicated RA preamble(s) and physical uplink shared channel (PUSCH) resource(s) for MSGA transmission. PRACH occasion(s) to be used for preamble transmission may also be indicated. In the first step of 2-step CFRA, the UE transmits the RA preamble on a PRACH and a payload on a PUSCH using the CFRA resources (i.e., a dedicated preamble/PUSCH resource/PRACH occasion). In the second step of 2-step CFRA, after MSGA transmission, the UE monitors for a response from the network (i.e., the gNB) within a configured window. If the UE receives a PDCCH addressed to the C-RNTI, the RA procedure is considered successfully completed. If the UE receives fallback information corresponding to the transmitted preamble, the RA procedure is considered successfully completed.

For certain events such as handover and BFR, if a dedicated preamble(s) and PUSCH resource(s) are assigned to the UE, during the first step of RA procedure, i.e., during RA resource selection for MSGA transmission, the UE determines whether to transmit the dedicated preamble or a non-dedicated preamble. Dedicated preambles are typically provided for a subset of SSBs/CSI-RSs. If there is no SSB/CSI-RS having a DL RSRP above a threshold among the SSBs/CSI-RSs for which CFRA resources (i.e., dedicated preambles/PRACH occasions/PUSCH resources) are provided by the gNB, the UE selects a non-dedicated preamble. Otherwise, the UE selects the dedicated preamble. During the RA procedure, one RA attempt may be 2-step CFRA, while another RA attempt may be 2-step CBRA.

Upon initiation of an RA procedure, the UE first selects the carrier (i.e., an SUL or NUL). If the carrier to use for the RA procedure is explicitly signaled by the gNB, the UE selects the signaled carrier for performing the RA procedure. If the carrier to use for the RA procedure is not explicitly signaled by the gNB; and if the serving cell for the RA procedure is configured with the SUL; and if the RSRP of the DL pathloss reference is less than rsrp-ThresholdSSB-SUL: then the UE selects the SUL carrier for performing RA procedure. Otherwise, the UE selects the NUL carrier for performing the RA procedure. Upon selecting the UL carrier, the UE determines the UL and DL BWP for RA procedure as specified in section 5.15 of technical specification (TS) 38.321. The UE then determines whether to perform 2-step or 4-step RA for this RA procedure.

If this RA procedure is initiated by a PDCCH order and if the ra-PreambleIndex explicitly provided by PDCCH is not 0b000000, the UE selects 4-step RA procedure.

Else if 2-step CFRA resources are signaled by the gNB for this RA procedure, the UE selects 2-step RA procedure.

Else if 4-step CFRA resources are signaled by the gNB for this RA procedure, the UE selects 4-step RA procedure.

Else if the UL BWP selected for this RA procedure is configured with only 2-step RA resources, the UE selects 2-step RA procedure.

Else if the UL BWP selected for this RA procedure is configured with only 4-step RA resources, the UE selects 4-step RA procedure.

Else if the UL BWP selected for this RA procedure is configured with both 2-step and 4-step RA resources and RSRP of the DL pathloss reference is below a configured threshold, the UE selects 4-step RA procedure. Otherwise, the UE selects 2-step RA procedure.

In the 5G wireless communication system. RRC can be in one of the following states: RRC_IDLE, RRC_INACTIVE, and RRC_CONNECTED. A user equipment (UE) is either in RRC_CONNECTED state or in RRC_INACTIVE state when an RRC connection has been established. If this is not the case, i.e., no RRC connection is established, the UE is in RRC_IDLE state. The RRC states can further be characterized as follows.

In the RRC_IDLE, a UE specific discontinuous reception (DRX) may be configured by upper layers. The UE monitors Short Messages transmitted with paging-radio network temporary identifier (P-RNTI) over downlink control information (DCI), monitors a Paging channel for core network (CN) paging using 5G system architecture evolution (SAE)-temporary mobile subscription identifier (5G-S-TMSI); performs neighboring cell measurements and cell (re-)selection; acquires system information (SI) and can send SI request (if configured); and performs logging of available measurements together with location and time for logged measurement configured UEs.

In RRC_INACTIVE, a UE specific DRX may be configured by upper layers or by RRC layer; UE stores the UE Inactive access stratum (AS) context; a radio access network (RAN)-based notification area is configured by RRC layer. The UE monitors Short Messages transmitted with P-RNTI over DCI; monitors a Paging channel for CN paging using 5G-S-TMSI and RAN paging using full inactive-RNTI (fullI-RNTI); performs neighboring cell measurements and cell (re-)selection; performs RAN-based notification area updates periodically and when moving outside the configured RAN-based notification area; acquires system information and can send SI request (if configured); and performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; and acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RAN notification area (RNA) update or by RAN paging from new generation (NG)-RAN. When the RRC connection is resumed, network configures the UE according to the RRC connection resume procedure based on the stored UE Inactive AS context and any RRC configuration received from the network. The RRC connection resume procedure re-activates AS security and re-establishes signaling radio bearer(s) (SRB(s)) and data radio bearer(s) (DRB(s)). In response to a request to resume the RRC connection, the network may resume the suspended RRC connection and send UE to an RRC_CONNECTED message, or reject the request to resume and send UE to an RRC_INACTIVE message (with a wait timer), or directly re-suspend the RRC connection and send UE to an RRC_INACTIVE message, or directly release the RRC connection and send UE to an RRC_IDLE message, or instruct the UE to initiate NAS level recovery (in this case the network sends an RRC setup message).

Upon initiating the resume procedure, UE:
apply the default layer 1 (L1) parameter values as specified in corresponding physical layer specifications, except for the parameters for which values are provided in system information block 1 (SIB1);
apply the default MAC Cell Group configuration;
apply the common control channel (CCCH) configuration;
start timer T319;
apply the timeAlignmentTimerCommon included in SIB1;
apply the default SRB1 configuration;
set the variable pendingRNA-Update to false;
initiate transmission of the RRCResumeRequest message or RRCResumeRequest1;
restore the RRC configuration, robust header compression (RoHC) state, the stored quality of service (QoS) flow to DRB mapping rules and the KgNB and KRRCint keys from the stored UE Inactive AS context except for the following: masterCellGroup; mrdc-SecondaryCellGroup, if stored; and pdcp-Config;
set the resumeMAC-I to the 16 least significant bits of the MAC-I calculated: over the abstract syntax notation one (ASN.1) encoded as per clause 8 (i.e., a multiple of 8 bits) VarResumeMAC-Input; with the KRRCint key in the UE Inactive AS Context and the previously configured integrity protection algorithm; and with all input bits for COUNT, BEARER and DIRECTION set to binary ones:
derive the KgNB key based on the current KgNB key or the next hop (NH), using the stored nextHopChainingCount value;
derive the KRRCenc key, the KRRCint key, the KUPint key and the KUPenc key;
configure lower layers to apply integrity protection for all signaling radio bearers except SRB0 using the configured algorithm and the KRRCint key and KUPint key, i.e., integrity protection shall be applied to all subsequent messages received and sent by the UE;
configure lower layers to apply ciphering for all signaling radio bearers except SRB0 and to apply the configured ciphering algorithm, the KRRCenc key and the KUPenc key derived above, i.e., the ciphering configuration shall be applied to all subsequent messages received and sent by the UE;
re-establish packet data convergence protocol (PDCP) entities for SRB1;
resume SRB1; and
*52transmit an RRCResumeRequest or RRCResumeRequest1 message.

Issue 1: In the current connection resume procedure in 5G wireless communication system. UE starts timer T319 and waits for RRCResume message from gNB. The timer takes into account the time needed to transmit RRCResumeRequest or RRCResumeRequest1 message and processing time needed at gNB to process the received RRCResumeRequest or RRCResumeRequest1 message. In case of connection resume procedure for small data transmission, gNB needs to not only process the received RRCResumeRequest or RRCResumeRequest1 message but also needs to process the uplink data received together with RRCResumeRequest or RRCResumeRequest1. gNB also needs to wait for downlink data in response to uplink data before responding to UE. So starting timer T319 for connection resume procedure for small data transmission may lead to expiry of timer before receiving response from gNB and UE will declare small data transmission failure.

Issue 2. In the current connection resume procedure in 5G wireless communication system, if the cell reselection occurs while connection resume procedure is ongoing. UE enters RRC_IDLE. For connection resumption initiated for small data transmission, cell reselection can occur while SDT is ongoing. Entering RRC_IDLE will result in data loss.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. An aspect of the disclosure is to provide a communication method and system for converging a 5th generation (5G) communication system for supporting higher data rates beyond a 4th generation (4G) system. More particularly, an aspect of the disclosure is to provide a communication method and system for small data transmission.

Additional aspects will be set forth in part in the description which follows and, in part, will be apparent from the description, or may be learned by practice of the presented embodiments.

In accordance with an aspect of the disclosure, a method performed by a terminal for small data transmission (SDT) in a wireless communication system is provided. The method includes receiving, from a base station, a radio resource control (RRC) release message with suspend configuration, entering an RRC inactive state in response to the RRC release message, during the RRC inactive state, transmitting, to the base station, an RRC resume request message, and determining whether to start a timer for SDT based on criteria for SDT, in response to transmitting the RRC resume request message.

In accordance with another aspect of the disclosure, a terminal in a wireless communication system is provided. The terminal includes a transceiver, and at least one processor coupled with the transceiver. The at least one processor is configured to: receive, from a base station via the transceiver, an RRC release message with suspend configuration, enter an RRC inactive state in response to the RRC release message, during the RRC inactive state, transmit, to a the base station via the transceiver, an RRC resume request message, and determine whether to start a timer for SDT based on criteria for SDT, in response to transmitting the RRC resume request message.

Other aspects, advantages, and salient features of the disclosure will become apparent to those skilled in the art from the following detailed description, which, taken in conjunction with the annexed drawings, discloses various embodiments of the disclosure.

Aspects of the disclosure address the above-mentioned problems and provide a robust and efficient method for small data transmission in RRC_INACTIVE state.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
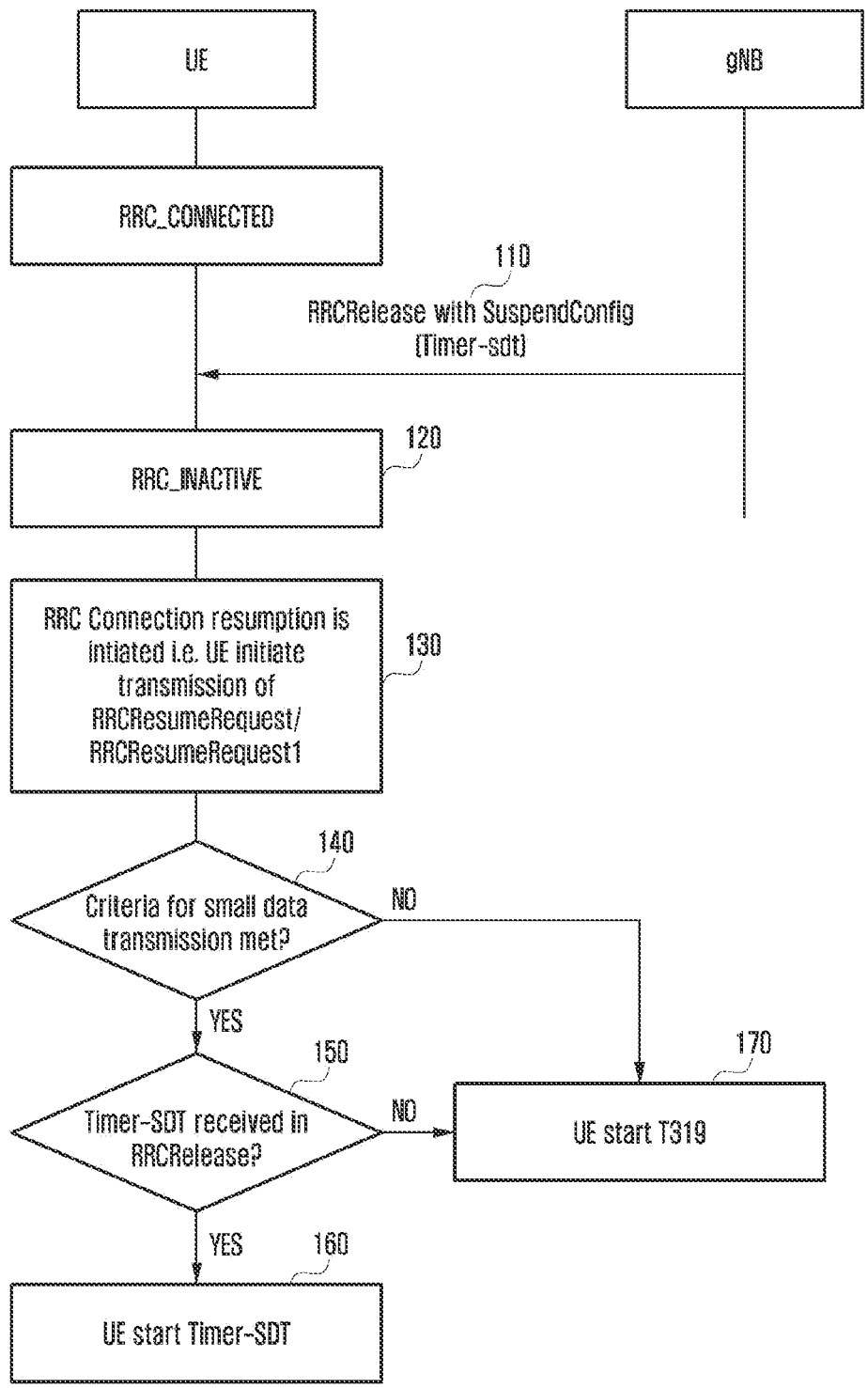
FIG. 1 illustrates the determination of response timer upon initiation of connection resume in RRC_INACTIVE in one method of this disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

It is known to those skilled in the art that blocks of a flowchart (or sequence diagram) and a combination of flowcharts may be represented and executed by non-transitory computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

Operation upon resumption of radio resource control (RRC) Connection for small data transmission in RRC_INACTIVE UE is in RRC_CONNECTED state. In the RRC_CONNECTED, the UE receives RRCRelease message with suspend configuration from gNB. Upon receiving the RRCRelease message with suspend configuration, the UE enters RRC_INACTIVE state and performs the following operations: the UE resets media access control (MAC) and releases the default MAC Cell Group configuration, if any. The UE re-establishes radio link control (RLC) entities for SRB1. The UE stores in the UE Inactive access stratum (AS) Context the current KgNB and KRRCint keys, the robust header compression (ROHC) state, the stored quality of service (QoS) flow to data radio bearer (DRB) mapping rules, the cell-radio network temporary identifier (C-RNTI) used in the source primary cell (PCell), the cellIdentity and the physical cell identity of the source PCell, and all other parameters configured except for the ones within ReconfigurationWithSync information element (IE) and servingCellConfigCommonSIB IE received in RRCReconfiguration message while the UE was in RRC_CONNECTED state. The UE also stores next hopping chain count (NCC) and other parameters received in RRCRelease message. The UE suspend all SRB(s) and DRB(s), except SRB0.

In the RRC_INACTIVE state, UE initiates RRC connection resumption for small data transmission (if criteria (e.g., reference signal received power (RSRP) is above a threshold and available data volume for transmission is smaller than a threshold and data is available for transmission in radio bearers (RBs) for which small data transmission (SDT) is allowed and/or connection resumption trigger is received from upper layer, i.e., non-access stratum (NAS) by RRC) to perform small data transmission as explained later are met). RRC connection resumption for small data transmission may also be referred as small data transmission procedure. Upon initiation of RRC connection resumption for small data transmission, UE performs the following operations:

apply the default layer 1 (L1) parameter values as specified in corresponding physical layer specifications, except for the parameters for which values are provided in system information block 1 (SIB1):
apply the default MAC Cell Group configuration;
apply the common control channel (CCCH) configuration;
start timer (see details later);
apply the timeAlignmentTimerCommon included in SIB1;
apply the default signaling radio bearer 1 (SRB1) configuration:
set the variable pendingRNA-Update to false;
initiate transmission of the RRCResumeRequest message or RRCResumeRequest1;
if field useFullResumeID is signaled in SIB1: select RRCResumeRequest1 as the message to use; and set the resumeIdentity to the stored full inactive-RNTI (fullI-RNTI) value:
else, i.e., if filed useFullResumeID is not signaled in SIB1: select RRCResumeRequest as the message to use, and set the resumeIdentity to the stored shortI-RNTI value;
restore the RRC configuration. RoHC state, the stored QoS flow to DRB mapping rules and the KgNB and KRRCint keys from the stored UE Inactive AS context except for the following: masterCellGroup; mrdc-SecondaryCellGroup, if stored; and pdcp-Config;
set the resumeMAC-I to the 16 least significant bits of the MAC-I calculated: over the abstract syntax notation one (ASN.1) encoded VarResumeMAC-Input; with the KRRCint key in the UE Inactive AS Context and the previously configured integrity protection algorithm; and with all input bits for COUNT, BEARER and DIRECTION set to binary ones;
derive the KgNB key based on the current KgNB key (i.e., KgNB key in stored UE Inactive AS context) or the next hop (NH), using the stored nextHopChainingCount (NCC) value; The stored nextHopChainingCount value is the nextHopChainingCount received in RRCRelease message. If nextHopChainingCount received in RRCRelease is same as the nextHopChainingCount associated with KgNB key in stored UE Inactive AS context, UE derives a new KgNB key based on the current KgNB key. Otherwise, UE derives a new KgNB key using NH. UE derives a new KgNB key using the physical cell identity (PCI) of camped cell, absolute radio-frequency channel number (ARFCN)-downlink (DL)/evolved ARFCN (EARFCN)-DL of camped cell and the current KgNB key/NH.
derive the KRRCenc key, the KRRCint key, the KUPint key and the KUPenc key using new KgNB key;
configure lower layers to apply integrity protection for all radio bearers except SRB0 using the configured algorithm and the KRRCint key and KUPint key, i.e., integrity protection shall be applied to all subsequent messages and user data received and sent by the UE; However, only DRBs with previously configured user plain (UP) integrity protection shall resume integrity protection:
configure lower layers to apply ciphering for all radio bearers except SRB0 and to apply the configured ciphering algorithm, the KRRCenc key and the KUPenc key derived above. i.e., the ciphering configuration shall be applied to all subsequent messages and data received and sent by the UE;

In an embodiment, UE re-establishes packet data convergence protocol (PDCP) entities for all SRBs and all DRBs (or re-establish PDCP entities for SRB1 and all DRBs) of master cell group (MCG); UE restores the ROHC state as explained later in this disclosure; UE does not resume SRB3 and DRBs of secondary cell group (SCG). Note that UE applies the PDCP configuration from stored AS context for the re-established PDCP entities of DRBs and SRB2. In an embodiment, whether to apply PDCP configuration from stored AS context or apply default PDCP configuration can be indicated by gNB in RRCRelease message or RRCReconfiguration message, and UE applies PDCP configuration from stored AS context or applies default PDCP configuration accordingly for the re-established PDCP entities of DRBs and SRB2.

re-establish RLC entities for DRBs (note that RLC entities for SRB1 is re-established when UE enters inactive state); Note that UE applies the RLC configuration from stored AS context for the re-established RLC entities of DRBs and SRB2. In an embodiment, whether to apply RLC configuration from stored AS context or apply default RLC configuration can be indicated by gNB in RRCRelease message or RRCReconfiguration message, and UE applies RLC configuration from stored AS context or applies default RLC configuration accordingly for the re-established RLC entities of DRBs and SRB2.

In an embodiment, UE resumes all SRBs and all DRBs (or resumes SRB1 and all DRBs) of MCG; UE does not resume SRB3 and DRBs of SCG. Upon initiating connection resume for small data transmission, at which point of time will PDCP provide dedicated traffic channel (DTCH) service data units (SDUs) to the lower layer, also needs to be specified. RRC can indicate this to PDCP upon resumption of DRBs; and transmit an RRCResumeRequest or RRCResumeRequest1 message. The user data are ciphered and integrity protected (Only for DRBs configured with UP integrity protection) and transmitted on DTCH multiplexed with the RRCResumeRequest/RRCResumeRequest1 message on CCCH0/CCCH1 respectively. Some assistance information can also be included like buffer status report (BSR) (regular or truncated); or a new MAC control element (CE) indicating UE has more uplink (UL) data or UE expects downlink (DL) data in response to UL Data and/or including synchronization signal reference signal received power (SS-RSRP) or channel quality indicator (CQI); or indication in RRC message indicating UE has more UL data or UE expects DL data in response to UL Data.

Instead of resuming all DRBs and re-establishing PDCP/RLC entities for all DRBs in the above operation, UE resumes and re-establishes PDCP/RLC entities for only those DRBs for which small data transmission is allowed.

The DRBs for which small data transmission is allowed can be signaled by gNB (e.g., in RRCRelease message or any other RRC signaling message). One or more DRB identities of DRBs for which small data transmission is allowed can be included in RRCRelease message.

A DRB is considered as allowed for small data transmission if data from logical channel (LCH) of this DRB is allowed to be transmitted according to LCH restrictions (allowedSCS-List, maxPUSCH-Duration, configuredGrantType1Allowed, allowedServingCells, allowedCG-List and allowedPHY-PriorityIndex) in the UL grant for small data transmission. One or more LCH restrictions are configured in LCH configuration of LCH associated with DRB, allowedSCS-List sets the allowed Subcarrier Spacing(s) (SCS(s)) for transmission. maxPUSCH-Duration which sets the maximum physical UL shared channel (PUSCH) duration allowed for transmission; configuredGrantType1Allowed which sets whether a configured grant Type 1 can be used for transmission; allowedServingCells which sets the allowed cell(s) for transmission; allowedCG-List which sets the allowed configured grant(s) for transmission; allowedPHY-PriorityIndex which sets the allowed physical (PHY) priority index(es) of a dynamic grant for transmission. For example, if SCS for UL grant for small data transmission is SCS X and LCH for a DRB is configured with allowedSCS-List wherein SCS X is not included in allowedSCS-List, the DRB is not considered for small data transmission.

Handling Timer for Connection Resumption in RRC_INACTIVE

Method 1

FIG. 1 illustrates the determination of response timer upon initiation of connection resume in RRC_INACTIVE in one method of this disclosure.

Referring to FIG. 1. UE is in RRC_CONNECTED. In the RRC_CONNECTED, UE receives an RRCRelease message with suspend configuration at operation 110. Timer for small data transmission, e.g., Timer-SDT is optionally signaled by gNB in RRCRelease message.

When UE enters RRC_INACTIVE in response to the RRCRelease message, the UE resets MAC and releases the default MAC Cell Group configuration, if any; and re-establishes RLC entities for SRB1 at operation 120. UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may store NCC and other parameters received in RRCRelease message and suspend all SRB(s) and DRB(s), except SRB0.

During the RRC_INACTIVE, UE initiates RRC connection resumption, i.e., UE initiates transmission of RRCResumeRequest/RRCResumeRequest1 message at operation 130.

UE determines if criteria (e.g., RSRP is above a threshold and available data volume for transmission is smaller than a threshold and data is available for transmission in RBs for which SDT is allowed and/or connection resumption trigger is received from upper layer, i.e., NAS by RRC) for small data transmission are met or not at operation 140.

If the criteria for small data transmission are met (the criteria are explained later), i.e., if the RRC connection resumption is for small data transmission: the UE determines whether Timer-sdt has been received in the RRCRelease message received at operation 110, i.e., the UE determines whether Timer-sdt has been received in immediately preceding RRCRelease message (or in RRCRelease message suspending the last RRC connection or in RRCRelease message terminating the last SDT procedure in RRC_INACTIVE state after releasing the RRC connection) at operation 150.

If Timer-sdt has been received in immediately preceding RRCRelease message (or in RRCRelease message suspending the last RRC connection or in RRCRelease message terminating the last SDT procedure in RRC_INACTIVE state after releasing the RRC connection): UE starts the timer Timer-sdt, in response to transmission of RRCResumeRequest/RRCResumeRequest1 message or upon initiating RRC connection resume procedure for small data transmission or upon initiating small data transmission procedure, at operation 160.

Else, i.e., if Timer-sdt has not been received in immediately preceding RRCRelease message (or in RRCRelease message suspending the last RRC connection or in RRCRelease message terminating the last SDT procedure in RRC_INACTIVE state after releasing the RRC connection): UE starts the timer T319 at operation 170. The value of T319 is received in SIB1 of currently camped cell. If value of T319 is not received in SIB1, UE applies default value of T319.

The other operations performed are same as explained earlier under "Operation upon resumption of RRC Connection for small data transmission in RRC_INACTIVE."

If criteria for small data transmission are not met (i.e., if the RRC connection resumption is not for small data transmission): UE starts the timer T319 at operation 170. The value of T319 is received in SIB1 of currently camped cell. If value of T319 is not received in SIB1, UE applies default value of T319.

In the above operation, RRC message (e.g., RRCReconfiguration message or system information (SI) message or SIB1) other than RRCRelease message can also be used to signal Timer-sdt to UE.

Method 2

UE is in RRC_CONNECTED. In the RRC_CONNECTED, UE receives an RRCRelease message with suspend configuration. Timer-SDT is optionally signaled by gNB in RRCRelease message.

When UE enters RRC_INACTIVE, the UE resets MAC and releases the default MAC Cell Group configuration, if any; and re-establishes RLC entities for SRB1. UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may store NCC and other parameters received in RRCRelease message and suspend all SRB(s) and DRB(s), except SRB0.

During the RRC_INACTIVE, UE initiates RRC connection resumption, i.e., UE initiates transmission of RRCResumeRequest/RRCResumeRequest1 message.

UE determines if criteria for small data transmission are met or not.

If the criteria for small data transmission are met (the criteria are explained later), i.e., if the RRC connection resumption is for small data transmission: the UE determines if Timer-sdt has been received in immediately preceding RRCRelease message (or in RRCRelease message suspending the last RRC connection or in RRCRelease message terminating the last SDT procedure in RRC_INACTIVE state after releasing the RRC connection).

If Timer-sdt has been received in immediately preceding RRCRelease message (or in RRCRelease message suspending the last RRC connection or in RRCRelease message terminating the last SDT procedure in RRC_INACTIVE state after releasing the RRC connection): UE starts the timer Timer-sdt.

Else, i.e., if Timer-sdt has not been received in immediately preceding RRCRelease message (or in RRCRelease message suspending the last RRC connection): UE applies default value of Timer-sdt.

The other operations performed are same as explained earlier under "Operation upon resumption of RRC Connection for small data transmission in RRC_INACTIVE."

If the criteria for small data transmission are not met, i.e., if the RRC connection resumption is not for small data transmission: UE starts the timer T319. The value of T319 is received in SIB1 of currently camped cell. If value of T319 is not received in SIB1, UE applies default value of T319.

In the above operation, RRC message (e.g., RRCReconfiguration message or SI message or SIB1) other than RRCRelease message can also be used to signal Timer-sdt to UE.

Method 3

UE is in RRC_CONNECTED. In the RRC_CONNECTED, UE receives an RRCRelease message with suspend configuration.

When UE enters RRC_INACTIVE, the UE resets MAC and releases the default MAC Cell Group configuration, if any; and re-establishes RLC entities for SRB1. UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may store next hopping chain count (NCC) and other parameters received in RRCRelease message and suspend all SRB(s) and DRB(s), except SRB0.

Timer-SDT and T319 are optionally received in SI (e.g., SIB1 or any other SIB) of camped cell.

During the RRC_INACTIVE, UE initiates RRC connection resumption, i.e., UE initiates transmission of RRCResumeRequest/RRCResumeRequest1 message.

UE determines if criteria for small data transmission are met or not.

If the criteria for small data transmission are met (the criteria are explained later), i.e., if the RRC connection resumption is for small data transmission: the UE determines if Timer-sdt has been received in SI (e.g., SIB1 or any other SIB) of currently camped cell.

If Timer-sdt has been received in SI of currently camped cell: UE starts the timer Timer-sdt.

Else, i.e., if Timer-sdt has not been received in SI of currently camped cell: UE starts the timer T319. The value of 1319 is received in SIB1 of currently camped cell. If value of T319 is not received in SIB1, UE applies default value of T319.

The other operations performed are same as explained earlier under "Operation upon resumption of RRC Connection for small data transmission in RRC_INACTIVE."

If criteria for small data transmission is not met, i.e., if the RRC connection resumption is not for small data transmission: UE starts the timer T319. The value of T319 is received in SIB1 of currently camped cell. If value of T319 is not received in SIB1, UE applies default value of T319.

Method 4

UE is in RRC_CONNECTED. In the RRC_CONNECTED. UE receives an RRCRelease message with suspend configuration.

When UE enters RRC_INACTIVE, the UE resets MAC and releases the default MAC Cell Group configuration, if any; and re-establishes RLC entities for SRB1. UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may store next hopping chain count (NCC) and other parameters received in RRCRelease message and suspend all SRB(s) and DRB(s), except SRB0;

Timer-SDT and T319 are optionally received in SI (e.g., SIB1 or any other SIB) of camped cell.

During the RRC_INACTIVE, UE initiates RRC connection resumption, i.e., UE initiates transmission of RRCResumeRequest/RRCResumeRequest1 message.

UE determines if criteria for small data transmission are met or not.

If the criteria for small data transmission are met (the criteria are explained later), i.e., if the RRC connection resumption is for small data transmission: the UE determines if Timer-sdt has been received in SI of currently camped cell.

If Timer-sdt has been received in SI of currently camped cell: UE starts the timer Timer-sdt.

Else, if Timer-sdt has not been received in SI of currently camped cell: UE applies default value of Timer-sdt.

The other operations performed are same as explained earlier under "Operation upon resumption of RRC Connection for small data transmission in RRC_INACTIVE."

If the criteria for small data transmission are not met, i.e., if the RRC connection resumption is not for small data transmission: UE starts the timer T319. The value of T319 is received in SIB1 of currently camped cell. If value of T319 is not received in SIB1, UE applies default value of T319.

In the methods 1 to 4, upon initiating connection resume for small data transmission and transmitting uplink data together with RRCResumeRequest/RRCResumeRequest1, if UE receives RRCResume message or UE receives RRCReject message or UE receives RRCSetup message or UE receives RRCRelease message. UE stops the timer Timer-sdt (if running). In addition, the UE may stop the timer Timer-sdt (if running) upon cell reselection during SDT procedure. RRCResume message is received on SRB1. RRCRelease message is received on SRB1. RRCReject message is received on SRB0. RRCSetup message is received on SRB0. RRCResume and RRCRelease are protected using security keys generated during the connection resume for small data transmission (as explained earlier).

In methods 1 to 4, upon initiating connection resume for small data transmission (or upon initiating small data transmission procedure), if the timer started (i.e., T319 or Timer-sdt is expired), the UE operation is as follows:

Option 1: UE enters RRC_IDLE, i.e., UE performs the following operation:
   reset MAC;
   set the variable pendingRNA-Update to false, if that is set to true;
   discard the UE Inactive AS context, if any;
   release the suspendConfig, if configured;
   discard the KgNB key, the S-KgNB key, the S-KeNB key, the KRRCenc key, the KRRCint key, the KUPint key and the KUPenc key, if any; (or discard the security keys generated upon initiating small data transmission procedure).
   release all radio resources, including release of the RLC entity, the backhaul adaptation protocol (BAP) entity, the MAC configuration and the associated PDCP entity, and service data adaptation protocol (SDAP) for all established radio bearers (RBs);
   indicate the release of the RRC connection to upper layers (i.e., NAS) together with the release cause (RRC Resume failure or small data transmission failure); and
   enter RRC_IDLE and perform cell selection.

Option 2: To avoid data loss, UE remains in RRC_INACTIVE instead of transitioning to RRC_IDLE, and performs the following operation:
   reset MAC;
   Release RLC entity for SRB0;
   Initiate RRC connection resume procedure for small data transmission again:
      apply the default L1 parameter values as specified in corresponding physical layer specifications, except for the parameters for which values are provided in SIB1;
      apply the default MAC Cell Group configuration;
      apply the CCCH configuration (RLC entity for SRB0 is re-established/created as part of this operation). CCCH configuration is pre-defined.
      start timer (as explained earlier);
      apply the timeAlignmentTimerCommon included in SIB1;
      apply the default SRB1 configuration;
      set the variable pendingRNA-Update to false;
         initiate transmission of the RRCResumeRequest message or RRCResumeRequest1 message;
      if field useFullResumeID is signaled in SIB1: select RRCResumeRequest1 as the message to use; and set the resumeIdentity to the stored fullI-RNTI value;
      else, i.e., if field useFullResumeID is not signaled in SIB1: select RRCResumeRequest as the message to use, and set the resumeIdentity to the stored shortI-RNTI value;
      set the resumeMAC-I to the 16 least significant bits of the MAC-I calculated: over the ASN.1 encoded VarResumeMAC-Input; with the KRRCint key in the UE Inactive AS Context and the previously configured integrity protection algorithm; and with all input bits for COUNT, BEARER and DIRECTION set to binary ones;
      re-establish RLC entities for SRB1;
      re-establish PDCP entities for SRB1: and
         indicate PDCP (i.e., PDCP entities for DRBs) to trigger PDCP SDU retransmission; and
         transmit an RRCResumeRequest or RRCResumeRequest1 message. The user data are ciphered and integrity protected (Only for DRBs configured with UP integrity protection) and transmitted on DTCH multiplexed with the RRCResumeRequest/RRCResumeRequest1 message on CCCH. Some assistance information can also be included like BSR (regular or truncated); or a New MAC CE indicating UE has more UL data or UE expects DL data in response to UL Data and/or including SS-RSRP or CQI; or indication in RRC message indicating UE has more UL data or UE expects DL data in response to UL Data.

In an embodiment, security keys are generated again. In an embodiment, PDCP is not re-established and RRC informs PDCP to trigger PDCP SDU retransmission.

Option 2 (Alternate): UE remains in RRC_INACTIVE, and performs the following operation:
   reset MAC;
   apply the default MAC Cell Group configuration:

re-establish RLC entities for SRB1;
re-establish PDCP entities for SRB1;
Indicate PDCP (i.e., PDCP entities for DRBs) to trigger PDCP SDU retransmission;
Indicate RLC entity of SRB0 to trigger RLC SDU retransmission; and
start timer (T319 or Timer-SDT as explained earlier).

Handling Cell Reselection while Small Data Transmission is Ongoing

UE is in RRC_CONNECTED and camped to cell A. In the RRC_CONNECTED, UE receives RRCRelease with suspend configuration.

When UE enters RRC_INACTIVE, the UE resets MAC and release the default MAC Cell Group configuration, if any; and re-establish RLC entities for SRB1. UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB, and suspend all SRB(s) and DRB(s), except SRB0.

During the RRC_INACTIVE, if UE has UL data to transmit, UE initiates RRC connection resumption for small data transmission and performs operations specified under "upon resumption of RRC Connection for small data transmission in RRC_INACTIVE."

While small data transmission is ongoing, if cell reselection criteria are met, UE reselects to another cell, i.e., a cell reselection may occur (e.g., from cell A to cell B) while the connection resumption in ongoing. UE performs the following operation if cell reselection occurs while small data transmission is ongoing, i.e. if ongoing RRC connection resumption is for SDT:

Option 1:
   Acquire the required system information (e.g. MIB, SIB1, etc.) in reselected cell;
   Stop timer T319 or Timer-SDT;
   reset MAC;
   set the variable pendingRNA-Update to false, if that is set to true;
   discard the UE Inactive AS context, if any;
   release the suspendConfig, if configured;
   discard the KgNB key, the S-KgNB key, the S-KeNB key, the KRRCenc key, the KRRCint key, the KUPint key and the KUPenc key, if any; (or discard the security keys generated upon initiating small data transmission procedure).
   release all radio resources, including release of the RLC entity, the BAP entity, the MAC configuration and the associated PDCP entity, and SDAP for all established RBs;
   indicate the release of the RRC connection to upper layers (i.e., NAS) together with the release cause (RRC Resume failure or small data transmission failure); and
   enter RRC_IDLE and perform cell selection.

In an embodiment, if ongoing RRC connection resumption is for SDT, a UE stops Timer-sdt and enter RRC_IDLE. Else, i.e., if the ongoing RRC connection resumption is not for SDT, the UE stops T319, enters RRC_IDLE, and performs the actions upon going to RRC_IDLE.

Option 2: UE remains in RRC_INACTIVE, and performs the following operation:
   Acquire the required system information (e.g., master information block (MIB), SIB1, etc.) in reselected cell;
   Stop timer T319 or Timer-SDT;
   reset MAC;
   Release RLC entity for SRB0;
   re-establish RLC entities for SRB1;
   discards the security keys which were generated upon initiation of connection resume, i.e., the UE discards the KgNB key, the S-KgNB key, the S-KeNB key, the KRRCenc key, the KRRCint key, the KUPint key and the KUPenc key, if any; (or discard the security keys generated upon initiating small data transmission procedure).

if small data transmission criteria are met in reselected cell, initiate RRC connection resume procedure for small data transmission again and perform the following:
   apply the default L1 parameter values as specified in corresponding physical layer specifications, except for the parameters for which values are provided in SIB1;
   *214—apply the default MAC Cell Group configuration:
   apply the CCCH configuration (RLC entity for SRB0 is re-established/created as part of this operation). CCCH configuration is pre-defined.
   start timer (as explained earlier);
   apply the timeAlignmentTimerCommon included in SIB1,
   apply the default SRB1 configuration;
   set the variable pendingRNA-Update to false;
      initiate transmission of the RRCResumeRequest message or RRCResumeRequest1 message;
   if field useFullResumeID is signaled in SIB1: select RRCResumeRequest1 as the message to use; and set the resumeIdentity to the stored fullI-RNTI value;
      else, i.e., if field useFullResumeID is not signaled in SIB1: select RRCResumeRequest as the message to use; and set the resumeIdentity to the stored shortI-RNTI value;
      restore the RRC configuration, RoHC state, the stored QoS flow to DRB mapping rules and the KgNB and KRRCint keys from the stored UE Inactive AS context except for the following: masterCellGroup; mrdc-SecondaryCellGroup, if stored; and pdcp-Config;
   set the resumeMAC-I to the 16 least significant bits of the MAC-I calculated: over the ASN.1 encoded VarResumeMAC-Input; with the KRRCint key in the UE Inactive AS Context and the previously configured integrity protection algorithm; and with all input bits for COUNT, BEARER and DIRECTION set to binary ones;
   generate security keys corresponding to reselected cell, i.e., the UE derives a new KgNB key based on the current KgNB key (i.e., KgNB key in stored UE Inactive AS context, not the KgNB key derived during the small data transmission before reselection) or the NH, using the stored nextHopChainingCount value; The stored nextHopChainingCount value is the nextHopChainingCount received in RRCRelease message. If nextHopChainingCount received in RRCRelease is same as the nextHopChainingCount associated with KgNB key in stored UE Inactive AS context, UE derives a new KgNB key based on the current KgNB key. Otherwise, UE derives a new KgNB key using NH. UE derives a new KgNB key using the PCI of reselected cell, ARFCN-DU/EARFCN-DL of reselected cell and the current KgNB key/NH. The UE derives the KRR- Cenc key, the KRRCint key, the KUPint key and the KUPenc key from the derived new KgNB key;

configure lower layers to apply integrity protection for all radio bearers except SRB0 using the configured algorithm and the KRRCint key and KUPint key, i.e., integrity protection shall be applied to all subsequent messages and user data received and sent by the UE; Only DRBs with previously configured UP integrity protection shall resume integrity protection.

configure lower layers to apply ciphering for all radio bearers except SRB0 and to apply the configured ciphering algorithm, the KRRCenc key and the KUPenc key derived in this subclause, i.e., the ciphering configuration shall be applied to all subsequent messages and data received and sent by the UE;

re-establish PDCP entities for SRB1;

indicate PDCP (i.e., PDCP entities for DRBs) to trigger PDCP SDU retransmission (PDCP entities for DRBs are re-established to apply newly generated security keys; RLC entities for DRBs are also be re-established); and transmit an RRCResumeRequest or RRCResumeRequest1 message. The user data are ciphered and integrity protected (Only for DRBs configured with UP integrity protection) and transmitted on DTCH multiplexed with the RRCResumeRequest/RRCResumeRequest1 message on CCCH. Some assistance information can also be included like BSR (regular or truncated); or a New MAC CE indicating UE has more UL data or UE expects DL data in response to UL Data and/or including SS-RSRP or CQI; or indication in RRC message indicating UE has more UL data or UE expects DL data in response to UL Data.

Else, i.e., if the small data transmission criteria are not met in reselected cell, Suspend all SRBs and DRBs except SRB0.

In an embodiment, if ongoing RRC connection resumption is for SDT, a UE stops Timer-sdt and continues in RRC_INACTIVE; discards the security keys which were generated upon initiation of connection resume; initiates connection resume again; generates security keys corresponding to reselected cell; and informs PDCP to trigger PDCP SDU retransmission. Else, i.e., if the ongoing RRC connection resumption is not for SDT, the UE stops T319, enters RRC_IDLE, and performs the actions upon going to RRC_IDLE.

Criteria to Perform Small Data Transmission (SDT) or not

If pre-configured UL resources are configured for small data transmission and criteria to perform SDT using pre-configured UL resources are met, a UE performs SDT using pre-configured UL resources.

Else: UE selects the UL carrier (normal UL (NUL) or supplementary UL (SUL)). UE selects the bandwidth part (BWP) (i.e., initial UL BWP/initial DL BWP) for random access procedure.

If only 4-step random access (RA) configuration is signaled by gNB for BWP selected for random access procedure, the UE checks whether criteria to perform SDT using 4-step RA are met or not. If met, the UE performs SDT using 4-step RA. Otherwise, the UE performs normal connection resume.

If both 2-step RA configuration and 4-step RA configuration are signaled by gNB for BWP selected for random access procedure: the UE compares RSRP of pathloss reference with a threshold. If RSRP of pathloss reference is less than or equal to the threshold: the UE checks whether criteria to perform SDT using 4-step RA are met or not. If met, the UE performs SDT using 4-step RA. Otherwise, the UE performs normal connection resume. Else, i.e., the RSRP of the pathloss reference is greater than the threshold, the UE checks whether criteria to perform SDT using 2-step RA are met or not. If met, the UE performs SDT using 2-step RA. Otherwise, the UE performs normal connection resume.

If only 2-step RA configuration is signaled by gNB for BWP selected for random access procedure, the UE checks whether criteria to perform SDT using 2-step RA are met or not. If met, the UE performs SDT using 2-step RA. Otherwise, the UE performs normal connection resume.

Criteria to Determine Whether to Use 4-Step RA for SDT or not

The UE can perform SDT using 4-step RA if all of the following conditions are met. Otherwise, the UE performs connection resume procedure without SDT.

*241Condition 1: the upper layers request resumption of an RRC connection. The resumption request is for mobile originating calls, and the establishment cause is mo-Data;

Condition 2: the UE supports SDT:

Condition 3: system information includes SDT configuration for 4-step RA:

Condition 4: UE has a stored value of the nextHopChainingCount provided in the RRCRelease message with suspend indication during the preceding suspend procedure; and Condition 5: RRCRelease message with suspend indication during the preceding suspend procedure indicates that UE is allowed to perform SDT using 4step RA.

NOTE: In order to control the UEs which can perform SDT, network can indicate whether UE is allowed to perform SDT or not in an RRCRelease message. If not allowed, UE will perform connection resume. Indication can be common for all methods of SDT. Indication can be separate for 4-step RA and 2-step RA. In one embodiment, Condition 5 is not used to determine SDT or not.

Condition 6: If the LCH restrictions for logical channel priority (LCP) are applied for SDT and all LCHs for which data is available for transmission is allowed to be multiplexed in Msg3 according to LCH restrictions.

Note: Network can also indicate the DRBs for which SDT is allowed. In this case, in Condition 6, LCHs corresponding to the DRBs for which SDT is allowed is considered. If data is available for transmission for DRBs other than DRBs for which SDT is allowed, UE shall initiate connection resume without SDT. In one embodiment, Condition 6 is not used to determine SDT or not.

Condition 7: Msg3 transport block size (TBS) and signal quality threshold criteria as explained below are met. One of the following options can be used to configure Msg3 TBS for SDT and to determine whether to use 4-step RA for small data transmission or normal connection resume.

Option 1: Single TBS, No Signal Quality Based Threshold gNB configures the parameter sdt-TBS which indicates the maximum allowed transport block size for small data transmission using 4-step RA. gNB selects a value for sdt-TBS from a set of configurable values. The parameter is separately configured for SUL and NUL as UL coverage is different for SUL and NUL.

If the message size (UL data available for transmission plus MAC header and, where required, MAC control elements) is less than equal to the transport block (TB) size signaled in sdt-TBS for the UL carrier selected for the random access procedure: UE initiates 4-step RA for small data transmission. Preamble group selection is not performed during this random access procedure.

Else, UE initiates 4-step RA for resuming connection (small data is not included).

Option 2: Single TBS, Single RSRP Threshold gNB configures the parameter sdt-TBS which indicates the maximum allowed transport block size for small data transmission using 4-step RA. gNB also configures the parameter sdt-Threshold. These parameters are separately configured for SUL and NUL as UL coverage is different for SUL and NUL.

If the message size (UL data available for transmission plus MAC header and, where required, MAC control elements) is less than equal to the TB size signaled in sdt-TBS for the UL carrier selected for random access procedure and RSRP of the downlink pathloss reference is greater than or equal to sdt-Threshold: UE initiates 4-step RA for small data transmission. Preamble group selection is not performed during this random access procedure.

Else, UE initiates 4-step RA for resuming connection (small data is not included).

Option 3: Multiple [TBS Size, Threshold, Preamble Group]

gNB configures the parameter sdt-TBS-groupA and sdt-TBS-groupB which indicates the maximum allowed transport block sizes for small data transmission using 4-step RA for preamble group A and preamble group B respectively. sdt-Threshold-groupB is also configured. These parameters are separately configured for SUL and NUL as UL coverage is different for SUL and NUL.

If the message size (UL data available for transmission plus MAC header and, where required, MAC control elements) is less than equal to the TB size signaled in sdt-TBS-groupA: UE performs small data transmission using 4-step RA. Group A is selected.

Else if the message size (UL data available for transmission plus MAC header and, where required, MAC control elements) is greater than TB size signaled in sdt-TBS-groupA and is less than equal to the TB size signaled in sdt-TBS-groupB for the selected UL carrier and RSRP of the downlink pathloss reference is greater than or equal to sdt-Threshold-groupB, UE performs small data transmission using 4-step RA. Group B is selected.

Else, UE initiates 4-step RA for resuming connection (small data is not included).

This option can be generalized wherein gNB configures the parameters sdt-TBS-group1 to sdt-TBS-groupN. sdt-Threshold-group2 to sdt-Threshold-groupN, and preambles for group 1 to N.

If the message size (UL data available for transmission plus MAC header and, where required, MAC control elements) is less than equal to the TB size signaled in sdt-TBS-group1: UE performs small data transmission using 4-step RA. Group 1 is selected.

Else if the message size (UL data available for transmission plus MAC header and, where required, MAC control elements) is greater than TB size signaled in sdt-TBS-group1 and is less than equal to the TB size signaled in sdt-TBS-group2 for the selected UL carrier and RSRP of the downlink pathloss reference is greater than or equal to sdt-Threshold-group2, UE performs small data transmission using 4-step RA. Group 2 is selected.

Else if the message size (UL data available for transmission plus MAC header and, where required, MAC control elements) is greater than TB size signaled in sdt-TBS-group2 and is less than equal to the TB size signaled in sdt-TBS-group3 for the selected UL carrier and RSRP of the downlink pathloss reference is greater than or equal to sdt-Threshold-group3, UE performs small data transmission using 4-step RA. Group 3 is selected.

Else if the message size (UL data available for transmission plus MAC header and, where required, MAC control elements) is greater than TB size signaled in sdt-TBS-groupN−1 and is less than equal to the TB size signaled in sdt-TBS-groupN for the selected UL carrier and RSRP of the downlink pathloss reference is greater than or equal to sdt-Threshold-groupN, UE performs small data transmission using 4-step RA. Group N is selected.

Else: UE initiates 4-step RA for resuming connection (small data is not included).

Option 3A:

gNB configures the parameter sdt-TBS-groupA and sdt-TBS-groupB which indicates the maximum allowed transport block sizes for small data transmission using 4-step RA for preamble group A and preamble group B respectively. sdt-Threshold-groupA and sdt-Threshold-groupB is also configured. These parameters are separately configured for SUL and NUL as UL coverage is different for SUL and NUL.

If the message size (UL data available for transmission plus MAC header and, where required, MAC control elements) is less than equal to the TB size signaled in sdt-TBS-groupA and RSRP of the downlink pathloss reference is greater than or equal to sdt-Threshold-groupA: UE performs small data transmission using 4-step RA. Group A is selected.

Else if the message size (UL data available for transmission plus MAC header and, where required, MAC control elements) is greater than TB size signaled in sdt-TBS-groupA and is less than equal to the TB size signaled in sdt-TBS-groupB for the selected UL carrier and RSRP of the downlink pathloss reference is greater than or equal to sdt-Threshold-groupB, UE performs small data transmission using 4-step RA. Group B is selected.

Else, UE initiates 4-step RA for resuming connection (small data is not included).

This option can be generalized wherein gNB configures the parameters sdt-TBS-group1 to sdt-TBS-groupN. sdt-Threshold-group1 to sdt-Threshold-groupN, and preambles for group 1 to N.

If the message size (UL data available for transmission plus MAC header and, where required, MAC control elements) is less than equal to the TB size signaled in sdt-TBS-group1 and RSRP of the downlink pathloss reference is greater than or equal to sdt-Threshold-group1: UE performs small data transmission using 4-step RA. Group 1 is selected.

Else if the message size (UL data available for transmission plus MAC header and, where required. MAC control elements) is greater than TB size signaled in sdt-TBS-group1 and is less than equal to the TB size signaled in sdt-TBS-group2 for the selected UL carrier and RSRP of the downlink pathloss reference is greater than or equal to sdt-Threshold-group2, UE performs small data transmission using 4-step RA. Group 2 is selected.

Else if the message size (UL data available for transmission plus MAC header and, where required, MAC control elements) is greater than TB size signaled in sdt-TBS-group2 and is less than equal to the TB size signaled in sdt-TBS-group3 for the selected UL carrier and RSRP of the downlink pathloss reference is greater than or equal to sdt-Threshold-group3, UE performs small data transmission using 4-step RA. Group 3 is selected.

Else if the message size (UL data available for transmission plus MAC header and, where required, MAC control elements) is greater than TB size signaled in sdt-TBS-groupN−1 and is less than equal to the TB size signaled in sdt-TBS-groupN for the selected UL carrier and RSRP of the downlink pathloss reference is greater than or equal to sdt-Threshold-groupN, UE performs small data transmission using 4-step RA. Group N is selected.

Else: UE initiates 4-step RA for resuming connection (small data is not included).

Option 4: Single TBS, Single messagePowerOffsetSDT for Pathloss Threshold gNB configures the parameter sdt-TBS which indicates the maximum allowed transport block size for small data transmission using 4-step RA. gNB also configures the parameter messagePowerOffsetSDT. These parameters are separately configured for SUL and NUL as UL coverage is different for SUL and NUL.

If the message size (UL data available for transmission plus MAC header and, where required, MAC control elements) is less than equal to the TB size signaled in sdt-TBS for the UL carrier selected for random access procedure and the pathloss is less than PCMAX (of the Serving Cell performing the Random Access Procedure)—preambleReceivedTargetPower—msg3-DeltaPreamble—messagePowerOffsetSDT: UE initiates 4-step RA for small data transmission.

Else, UE initiates 4-step RA for resuming connection (small data is not included).

Option 5: Multiple [TBS Size, messagePowerOffsetSDT, Preamble Group]

gNB configures the parameter sdt-TBS-groupA and sdt-TBS-groupB which indicates the maximum allowed transport block sizes for small data transmission using 4-step RA for preamble group A and preamble group B respectively. These parameters are separately configured for SUL and NUL as UL coverage is different for SUL and NUL.

If the message size (UL data available for transmission plus MAC header and, where required, MAC control elements) is less than equal to the TB size signaled in sdt-TBS-groupA: UE performs small data transmission using 4-step RA. Group A is selected.

Else if the message size (UL data available for transmission plus MAC header and, where required, MAC control elements) is greater than TB size signaled in sdt-TBS-groupA and is less than equal to the TB size signaled in sdt-TBS-groupB for the selected UL carrier and the pathloss is less than PCMAX (of the Serving Cell performing the Random Access Procedure)—preambleReceivedTargetPower—msg3-DeltaPreamble—messagePowerOffsetGroupB, UE performs small data transmission using 4-step RA. Group B is selected.

Else, UE initiates 4-step RA for resuming connection (small data is not included).

This option can be generalized wherein gNB configures the parameters sdt-TBS-group1 to sdt-TBS-groupN, messagePowerOffsetGroup2 to messagePowerOffsetGroupN, and preambles for group 1 to N.

If the message size (UL data available for transmission plus MAC header and, where required, MAC control elements) is less than equal to the TB size signaled in sdt-TBS-group1: UE performs small data transmission using 4-step RA. Group 1 is selected.

Else if the message size (UL data available for transmission plus MAC header and, where required, MAC control elements) is greater than TB size signaled in sdt-TBS-group1 and is less than equal to the TB size signaled in sdt-TBS-group2 for the selected UL carrier and the pathloss is less than PCMAX (of the Serving Cell performing the Random Access Procedure)—preambleReceivedTargetPower—msg3-DeltaPreamble—messagePowerOffsetGroup2, UE performs small data transmission using 4-step RA. Group 2 is selected.

Else if the message size (UL data available for transmission plus MAC header and, where required, MAC control elements) is greater than TB size signaled in sdt-TBS-group2 and is less than equal to the TB size signaled in sdt-TBS-group3 for the selected UL carrier and the pathloss is less than PCMAX (of the Serving Cell performing the Random Access Procedure)—preambleReceivedTargetPower—msg3-DeltaPreamble—messagePowerOffsetGroup3, UE performs small data transmission using 4-step RA. Group 3 is selected.

Else if the message size (UL data available for transmission plus MAC header and, where required, MAC control elements) is greater than TB size signaled in sdt-TBS-groupN−1 and is less than equal to the TB size signaled in sdt-TBS-groupN for the selected UL carrier and the pathloss is less than PCMAX (of the Serving Cell performing the Random Access Procedure)—preambleReceivedTargetPower—msg3-DeltaPreamble—messagePowerOffsetGroupN, UE performs small data transmission using 4-step RA. Group N is selected.

Else: UE initiates 4-step RA for resuming connection (small data is not included).

Option 5A:

gNB configures the parameter sdt-TBS-groupA and sdt-TBS-groupB which indicates the maximum allowed transport block sizes for small data transmission using 4-step RA for preamble group A and preamble group B respectively. These parameters are separately configured for SUL and NUL as UL coverage is different for SUL and NUL.

If the message size (UL data available for transmission plus MAC header and, where required, MAC control elements) is less than equal to the TB size signaled in sdt-TBS-groupA and the pathloss is less than PCMAX (of the Serving Cell performing the Random Access Procedure)—preambleReceivedTargetPower—msg3-DeltaPreamble—messagePowerOffsetGroupA: UE performs small data transmission using 4-step RA. Group A is selected.

Else if the message size (UL data available for transmission plus MAC header and, where required, MAC control elements) is greater than TB size signaled in sdt-TBS-groupA and is less than equal to the TB size signaled in sdt-TBS-groupB for the selected UL carrier and the pathloss is less than PCMAX (of the Serving Cell performing the Random Access Procedure)—preambleReceivedTargetPower—msg3-DeltaPreamble—messagePowerOffsetGroupB, UE performs small data transmission using 4-step RA. Group B is selected.

Else, UE initiates 4-step RA for resuming connection (small data is not included).

This option can be generalized wherein gNB configures the parameters sdt-TBS-group1 to sdt-TBS-groupN, messagePowerOffsetGroup1 to messagePowerOffsetGroupN, and preambles for group 1 to N.

If the message size (UL data available for transmission plus MAC header and, where required, MAC control elements) is less than equal to the TB size signaled in sdt-TBS-group1 and the pathloss is less than PCMAX (of the Serving Cell performing the Random Access Procedure)—preambleReceivedTargetPower—msg3-DeltaPreamble—messagePowerOffsetGroup1: UE performs small data transmission using 4-step RA. Group 1 is selected.

Else if the message size (UL data available for transmission plus MAC header and, where required, MAC control elements) is greater than TB size signaled in sdt-TBS-group1 and is less than equal to the TB size signaled in sdt-TBS-group2 for the selected UL carrier and the pathloss is less than PCMAX (of the Serving Cell performing the Random Access Procedure)—preambleReceivedTargetPower—msg3-DeltaPreamble—messagePowerOffsetGroup2, UE performs small data transmission using 4-step RA. Group 2 is selected.

Else if the message size (UL data available for transmission plus MAC header and, where required, MAC control elements) is greater than TB size signaled in sdt-TBS-group2 and is less than equal to the TB size signaled in sdt-TBS-group3 for the selected UL carrier and the pathloss is less than PCMAX (of the Serving Cell performing the Random Access Procedure)—preambleReceivedTargetPower—msg3-DeltaPreamble—messagePowerOffsetGroup3, UE performs small data transmission using 4-step RA. Group 3 is selected.

Else if the message size (UL data available for transmission plus MAC header and, where required, MAC control elements) is greater than TB size signaled in sdt-TBS-groupN−1 and is less than equal to the TB size signaled in sdt-TBS-groupN for the selected UL carrier and the pathloss is less than PCMAX (of the Serving Cell performing the Random Access Procedure)—preambleReceivedTargetPower—msg3-DeltaPreamble—messagePowerOffsetGroupN, UE performs small data transmission using 4-step RA. Group N is selected.

Else: UE initiates 4-step RA for resuming connection (small data is not included).

Option 6: Multiple [TBS, Preamble Group]

gNB configures the parameter sdt-TBS-groupA and sdt-TBS-groupB which indicates the maximum allowed transport block sizes for small data transmission using 4-step RA for preamble group A and preamble group B respectively. These parameters are separately configured for SUL and NUL as UL coverage is different for SUL and NUL.

If the message size (UL data available for transmission plus MAC header and, where required, MAC control elements) is less than equal to the TB size signaled in sdt-TBS-groupA: UE performs small data transmission using 4-step RA. Group A is selected.

Else if the message size (UL data available for transmission plus MAC header and, where required, MAC control elements) is greater than TB size signaled in sdt-TBS-groupA and is less than equal to the TB size signaled in sdt-TBS-groupB for the selected UL carrier, UE performs small data transmission using 4-step RA. Group B is selected.

Else, UE initiates 4-step RA for resuming connection (small data is not included).

This option can be generalized wherein gNB configures the parameters sdt-TBS-group1 to sdt-TBS-groupN, and preambles for group 1 to N.

If the message size (UL data available for transmission plus MAC header and, where required, MAC control elements) is less than equal to the TB size signaled in sdt-TBS-group1: UE performs small data transmission using 4-step RA. Group 1 is selected.

Else if the message size (UL data available for transmission plus MAC header and, where required, MAC control elements) is greater than TB size signaled in sdt-TBS-group1 and is less than equal to the TB size signaled in sdt-TBS-group2 for the selected UL carrier, UE performs small data transmission using 4-step RA. Group 2 is selected.

Else if the message size (UL data available for transmission plus MAC header and, where required, MAC control elements) is greater than TB size signaled in sdt-TBS-group2 and is less than equal to the TB size signaled in sdt-TBS-group3 for the selected UL carrier, UE performs small data transmission using 4-step RA. Group 3 is selected.

Else if the message size (UL data available for transmission plus MAC header and, where required, MAC control elements) is greater than TB size signaled in sdt-TBS-groupN−1 and is less than equal to the TB size signaled in sdt-TBS-groupN for the selected UL, UE performs small data transmission using 4-step RA. Group N is selected.

Else: UE initiates 4-step RA for resuming connection (small data is not included).

Criteria to Determine Whether to Use 2-Step RA for SDT or not

The UE can perform SDT using 2-step RA if all of the following conditions are met. Otherwise. UE performs connection resume procedure without SDT.

- Condition 1: the upper layers request resumption of an RRC connection. The resumption request is for mobile originating calls, and the establishment cause is mo-Data;
- Condition 2: the UE supports SDT;
- Condition 3: system information includes SDT configuration for 2-step RA;
- Condition 4: UE has a stored value of the nextHopChainingCount provided in the RRCRelease message with suspend indication during the preceding suspend procedure; and
- Condition 5: RRCRelease message with suspend indication during the preceding suspend procedure indicates that UE is allowed to perform SDT using 2-step RA.

In order to control the UEs which can perform SDT, network can indicate whether UE is allowed to perform SDT or not in an RRCRelease message. If not allowed, UE will perform connection resume. Indication can be common for all methods of SDT. Indication can be separate for 4-step RA and 2-step RA. In one embodiment, Condition 5 is not used to determine SDT or not.

- Condition 6: If the LCH restrictions for LCP are applied for SDT and all LCHs for which data is available for transmission is allowed to be multiplexed in MsgA according to LCH restrictions.

Network can also indicate the DRBs for which SDT is allowed. In this case, in Condition 6, LCHs corresponding to the DRBs for which SDT is allowed is considered. If data is available for transmission for DRBs other than DRBs for which SDT is allowed, UE shall initiate connection resume without SDT. In one embodiment, Condition 6 is not used to determine SDT or not.

- Condition 7: MsgA TBS and signal quality threshold criteria as explained below are met. One of the following options can be used to configure MsgA TBS for SDT and to determine whether to use 2-step RA for small data transmission or normal connection resume.

Option 1: Single MsgA PUSCH Configuration. No Signal Quality Based Threshold gNB configures a single MsgA-PUSCH-Config-SDT (i.e., a PUSCH resource pool) in 2-step RA configuration for SDT. The TBS is not explicitly signaled but determined based on SCS, number of physical resource blocks (PRBs)

and number of orthogonal frequency division multiplexing (OFDM) symbols of paging occasion (PO).

If the message size (UL data available for transmission plus MAC header and, where required, MAC control elements) is less than equal to the TB size of MsgA payload according to MsgA-PUSCH-Config-SDT on UL carrier selected for random access procedure: UE initiates 2-step RA for small data transmission. Preamble group selection is not performed during this random access procedure.

Else, UE initiates 2-step RA for resuming connection (small data is not included).

Option 2: Single MsgA PUSCH Configuration, Single RSRP Threshold gNB configures a single MsgA-PUSCH-Config-SDT (i.e., a PUSCH resource pool) in 2-step RA configuration for SDT. The TBS is not explicitly signaled but determined based on SCS, number of PRBs and number of OFDM symbols of PO. gNB also configures the parameter sdt-Threshold-MsgA. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT on UL carrier selected for random access procedure and RSRP of the downlink pathloss reference is greater than or equal to sdt-Threshold-MsgA: UE initiates 2-step RA for small data transmission. Preamble group selection is not performed during this random access procedure.

Else, UE initiates 2-step RA for resuming connection (small data is not included).

Option 3: Multiple [MsgA PUSCH Configuration, Threshold, Preamble Group]

gNB configures the parameter MsgA-PUSCH-Config-SDT-groupA and MsgA-PUSCH-Config-SDT-group B in 2-step RA configuration for SDT. The TBS is not explicitly signaled but determined based on SCS, number of PRBs and number of OFDM symbols of PO. sdt-Threshold-MsgA-groupB is also configured. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT-groupA for SDT on UL carrier selected for random access procedure: UE performs small data transmission using 2-step RA. Group A is selected.

Else if the message size (UL data available for transmission plus MAC header and, where required, MAC control elements) is less than equal to the TB size of MsgA payload according to MsgA-PUSCH-Config-SDT-groupB for the selected UL carrier and RSRP of the downlink pathloss reference is greater than or equal to sdt-Threshold-MsgA-groupB, UE performs small data transmission using 2-step RA. Group B is selected.

Else, UE initiates 2-step RA for resuming connection (small data is not included).

This option can be generalized wherein gNB configures the parameters MsgA-PUSCH-Config-SDT-group1 to MsgA-PUSCH-Config-SDT-groupN, sdt-Threshold-MsgA-group2 to sdt-Threshold-MsgA-groupN, and preambles for group 1 to N.

If the message size (UL data available for transmission plus MAC header and, where required, MAC control elements) is less than equal to the TB size of MsgA payload according to MsgA-PUSCH-Config-SDT-group1 for SDT on UL carrier selected for random access procedure: UE performs small data transmission using 2-step RA. Group 1 is selected.

Else if the message size (UL data available for transmission plus MAC header and, where required, MAC control elements) is less than equal to the TB size of MsgA payload according to MsgA-PUSCH-Config-SDT-group2 for SDT on UL carrier selected for random access procedure and RSRP of the downlink pathloss reference is greater than or equal to sdt-Threshold-MsgA-group2. UE performs small data transmission using 2-step RA Group 2 is selected.

Else if the message size (UL data available for transmission plus MAC header and, where required, MAC control elements) is greater than TB size of MsgA payload according to MsgA-PUSCH-Config-SDT-group2 and ('is greater than TB size of MsgA payload according to MsgA-PUSCH-Config-SDT-group2 and' can be removed in one embodiment) is less than equal to the TB size of MsgA payload according to MsgA-PUSCH-Config-SDT-group3 for SDT on UL carrier selected for random access procedure and RSRP of the downlink pathloss reference is greater than or equal to sdt-Threshold-MsgA-group3, UE performs small data transmission using 2-step RA. Group 3 is selected.

Else if the message size (UL data available for transmission plus MAC header and, where required, MAC control elements) is greater than TB size of MsgA payload according to MsgA-PUSCH-Config-SDT-groupN−1 and ('is greater than TB size of MsgA payload according to MsgA-PUSCH-Config-SDT-groupN−1 and' can be removed in one embodiment) is less than equal to the TB size of MsgA payload according to MsgA-PUSCH-Config-SDT-groupN for SDT on UL carrier selected for random access procedure and RSRP of the downlink pathloss reference is greater than or equal to sdt-Threshold-MsgA-groupN, UE performs small data transmission using 2-step RA. Group N is selected.

Else: UE initiates 2-step RA for resuming connection (small data is not included).

Option 3A:

gNB configures the parameter MsgA-PUSCH-Config-SDT-groupA and MsgA-PUSCH-Config-SDT-groupB in 2-step RA configuration for SDT. The TBS is not explicitly signaled but determined based on SCS, number of PRBs and number of OFDM symbols of PO. sdt-Threshold-MsgA-groupA and sdt-Threshold-MsgA-groupB are also configured. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT-groupA for SDT on UL carrier selected for random access procedure and RSRP of the downlink pathloss reference is greater than or equal to sdt-Threshold-MsgA-groupA: UE performs small data transmission using 2-step RA. Group A is selected.

Else if the message size (UL data available for transmission plus MAC header and, where required, MAC control elements) is greater than TB size of MsgA payload according to MsgA-PUSCH-Config-SDT-groupA and ('is greater than TB size of MsgA payload according to MsgA-PUSCH-Config-SDT-groupA and' can be removed in one embodiment) is less than equal to the TB size of MsgA payload according to MsgA-PUSCH-Config-SDT-groupB for the selected UL carrier and RSRP of the downlink pathloss reference is greater than or equal to sdt-Threshold-MsgA-groupB, UE performs small data transmission using 2-step RA. Group B is selected.

Else, UE initiates 2-step RA for resuming connection (small data is not included).

This option can be generalized wherein gNB configures the parameters MsgA-PUSCH-Config-SDT-group1 to MsgA-PUSCH-Config-SDT-groupN, sdt-Threshold-MsgA-group1 to sdt-Threshold-MsgA-groupN, and preambles for group 1 to N.

If the message size (UL data available for transmission plus MAC header and, where required, MAC control elements) is less than equal to the TB size of MsgA payload according to MsgA-PUSCH-Config-SDT-group1 for SDT on UL carrier selected for random access procedure and RSRP of the downlink pathloss reference is greater than or equal to sdt-Threshold-MsgA-group1: UE performs small data transmission using 2-step RA. Group 1 is selected.

Else if the message size (UL data available for transmission plus MAC header and, where required, MAC control elements) is greater than TB size of MsgA payload according to MsgA-PUSCH-Config-SDT-group1 and ('is greater than TB size of MsgA payload according to MsgA-PUSCH-Config-SDT-group1 and' can be removed in one embodiment) is less than equal to the TB size of MsgA payload according to MsgA-PUSCH-Config-SDT-group2 for SDT on UL carrier selected for random access procedure and RSRP of the downlink pathloss reference is greater than or equal to sdt-Threshold-MsgA-group2, UE performs small data transmission using 2-step RA. Group 2 is selected.

Else if the message size (UL data available for transmission plus MAC header and, where required, MAC control elements) is greater than TB size of MsgA payload according to MsgA-PUSCH-Config-SDT-group2 and ('is greater than TB size of MsgA payload according to MsgA-PUSCH-Config-SDT-group2 and' can be removed in one embodiment) is less than equal to the TB size of MsgA payload according to MsgA-PUSCH-Config-SDT-group3 for SDT on UL carrier selected for random access procedure and RSRP of the downlink pathloss reference is greater than or equal to sdt-Threshold-MsgA-group3, UE performs small data transmission using 2-step RA. Group 3 is selected.

Else if the message size (UL data available for transmission plus MAC header and, where required, MAC control elements) is greater than TB size of MsgA payload according to MsgA-PUSCH-Config-SDT-groupN−1 and ('is greater than TB size of MsgA payload according to MsgA-PUSCH-Config-SDT-groupN−1 and' can be removed in one embodiment) is less than equal to the TB size of MsgA payload according to MsgA-PUSCH-Config-SDT-groupN for SDT on UL carrier selected for random access procedure and RSRP of the downlink pathloss reference is greater than or equal to sdt-Threshold-MsgA-groupN, UE performs small data transmission using 2-step RA. Group N is selected.

Else: UE initiates 2-step RA for resuming connection (small data is not included).

Option 4: Single MsgA PUSCH Configuration, Single msgA-messagePowerOffsetSDT for Pathloss Threshold gNB configures a single MsgA-PUSCH-Config-SDT (i.e., a PUSCH resource pool) in 2-step RA configuration for SDT. The TBS is not explicitly signaled but determined based on SCS, number of PRBs and number of OFDM symbols of PO. gNB also configures the parameter msgA-messagePowerOffsetSDT. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA PUSCH configuration for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffsetSDT: UE initiates 2-step RA for small data transmission.

Else, UE initiates 2-step RA for resuming connection (small data is not included).

Option 5: Multiple [MsgA PUSCH Configuration, msgA-messagePowerOffsetSDT, Preamble Group]

gNB configures the parameter MsgA-PUSCH-Config-SDT-groupA and MsgA-PUSCH-Config-SDT-groupB in 2-step RA configuration for SDT. The TBS is not explicitly signaled but determined based on SCS, number of PRBs and number of OFDM symbols of PO. msgA-messagePowerOffset-groupB is also configured. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT-groupA for SDT on UL carrier selected for random access procedure: UE performs small data transmission using 2-step RA. Group A is selected.

Else if the message size (UL data available for transmission plus MAC header and, where required, MAC control elements) is greater than TB size of MsgA payload according to MsgA-PUSCH-Config-SDT-groupA and ('is greater than TB size of MsgA payload according to MsgA-PUSCH-Config-SDT-groupA and' can be removed in one embodiment) is less than equal to the TB size of MsgA payload according to MsgA-PUSCH-Config-SDT-groupB for the selected UL carrier and the pathloss is less than PCMAX (of the Serving Cell performing the Random Access Procedure)—msgA-preambleReceivedTargetPower—msgA-DeltaPreamble—msgA-messagePowerOffset-groupB, UE performs small data transmission using 2-step RA. Group B is selected.

Else, UE initiates 2-step RA for resuming connection (small data is not included).

This option can be generalized wherein gNB configures the parameters MsgA-PUSCH-Config-SDT-group1 to MsgA-PUSCH-Config-SDT-groupN, msgA-messagePowerOffset-group2 to msgA-messagePowerOffset-groupN, and preambles for group 1 to N.

If the message size (UL data available for transmission plus MAC header and, where required, MAC control elements) is less than equal to the TB size of MsgA payload according to MsgA-PUSCH-Config-SDT-group1 for SDT on UL carrier selected for random access procedure: UE performs small data transmission using 2-step RA. Group 1 is selected.

Else if the message size (UL data available for transmission plus MAC header and, where required, MAC control elements) is greater than TB size of MsgA payload according to MsgA-PUSCH-Config-SDT-group1 and ('is greater than TB size of MsgA payload according to MsgA-PUSCH-Config-SDT-group1 and' can be removed in one embodiment) is less than equal to the TB size of MsgA payload according to MsgA-PUSCH-Config-SDT-group2 for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-group2, UE performs small data transmission using 2-step RA. Group 2 is selected.

Else if the message size (UL data available for transmission plus MAC header and, where required, MAC control elements) is greater than TB size of MsgA payload according to MsgA-PUSCH-Config-SDT-group2 and ('is greater than TB size of MsgA payload according to MsgA-PUSCH-Config-SDT-group1 and' can be removed in one embodiment) is less than equal to the TB size of MsgA payload according to MsgA-PUSCH-Config-SDT-group3 for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-group2. UE performs small data transmission using 2-step RA. Group 3 is selected.

Else if the message size (UL data available for transmission plus MAC header and, where required, MAC control elements) is greater than TB size of MsgA payload according to MsgA-PUSCH-Config-SDT-groupN−1 and ('is greater than TB size of MsgA payload according to MsgA-PUSCH-Config-SDT-groupN−1 and' can be removed in one embodiment) is less than equal to the TB size of MsgA payload according to MsgA-PUSCH-Config-SDT-groupN for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-groupN, UE performs small data transmission using 2-step RA. Group N is selected.

Else: UE initiates 2-step RA for resuming connection (small data is not included).

Option 5A:

gNB configures the parameter MsgA-PUSCH-Config-SDT-groupA and MsgA-PUSCH-Config-SDT-groupB in 2-step RA configuration for SDT. The TBS is not explicitly signaled but determined based on SCS, number of PRBs and number of OFDM symbols of PO. msgA-messagePowerOffset-groupA and msgA-messagePowerOffset-groupB is also configured. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT-groupA for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-groupA: UE performs small data transmission using 2-step RA. Group A is selected.

Else if the message size (UL data available for transmission plus MAC header and, where required, MAC control elements) is greater than TB size of MsgA payload according to MsgA-PUSCH-Config-SDT-groupA and ('is greater than TB size of MsgA payload according to MsgA-PUSCH-Config-SDT-groupA and' can be removed in one embodiment) is less than equal to the TB size of MsgA payload according to MsgA-PUSCH-Config-SDT-groupB for the selected UL carrier and the pathloss is less than PCMAX (of the Serving Cell performing the Random Access Procedure)—msgA-preambleReceivedTargetPower—msgA-DeltaPreamble—msgA-messagePowerOffset-groupB, UE performs small data transmission using 2-step RA. Group B is selected.

Else, UE initiates 2-step RA for resuming connection (small data is not included).

This option can be generalized wherein gNB configures the parameters MsgA-PUSCH-Config-SDT-group1 to MsgA-PUSCH-Config-SDT-groupN, msgA-messagePowerOffset-group1 to msgA-messagePowerOffset-groupN, and preambles for group 1 to N.

If the message size (UL data available for transmission plus MAC header and, where required, MAC control elements) is less than equal to the TB size of MsgA payload according to MsgA-PUSCH-Config-SDT-group1 for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-group1: UE performs small data transmission using 2-step RA. Group 1 is selected.

Else if the message size (UL data available for transmission plus MAC header and, where required, MAC control elements) is greater than TB size of MsgA payload according to MsgA-PUSCH-Config-SDT-group1 and ('is greater than TB size of MsgA payload according to MsgA-PUSCH-Config-SDT-group1 and' can be removed in one embodiment) is less than equal to the TB size of MsgA payload according to MsgA-PUSCH-Config-SDT-group2 for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-group2. UE performs small data transmission using 2-step RA. Group 2 is selected.

Else if the message size (UL data available for transmission plus MAC header and, where required, MAC control elements) is greater than TB size of MsgA payload according to MsgA-PUSCH-Config-SDT-group2 and ('is greater than TB size of MsgA payload according to MsgA-PUSCH-Config-SDT-group2 and' can be removed in one embodiment) is less than equal to the TB size of MsgA payload according to MsgA-PUSCH-Config-SDT-group3 for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-group2, UE performs small data transmission using 2-step RA. Group 3 is selected.

Else if the message size (UL data available for transmission plus MAC header and, where required, MAC control elements) is greater than TB size of MsgA payload according to MsgA-PUSCH-Config-SDT-groupN−1 and ('is greater than TB size of MsgA payload according to MsgA-PUSCH-Config-SDT-groupN−1 and' can be removed in one embodiment) is less than equal to the TB size of MsgA payload according to MsgA-PUSCH-Config-SDT-groupN for SDT on UL carrier selected for random access procedure and the pathloss is less than PCMAX (of the Serving Cell performing the Random Access Procedure)—msgA-preambleReceivedTargetPower—msgA-DeltaPreamble—msgA-messagePowerOffset-groupN, UE performs small data transmission using 2-step RA. Group N is selected.

Else: UE initiates 2-step RA for resuming connection (small data is not included).

Option 6: Multiple [TBS, Preamble Group]

gNB configures the parameter MsgA-PUSCH-Config-SDT-groupA and MsgA-PUSCH-Config-SDT-groupB in 2-step RA configuration for SDT. The TBS is not explicitly signaled but determined based on SCS, number of PRBs and number of OFDM symbols of PO. These parameters are separately configured for SUL and NUL as UL coverage is different for SUL and NUL.

If the message size (UL data available for transmission plus MAC header and, where required, MAC control elements) is less than equal to the TB size of MsgA payload according to MsgA-PUSCH-Config-SDT-groupA: UE performs small data transmission using 2-step RA. Group A is selected.

Else if the message size (UL data available for transmission plus MAC header and, where required, MAC control elements) is less than equal to the TB size TB size of MsgA payload according to MsgA-PUSCH-Config-SDT-groupB, UE performs small data transmission using 2-step RA. Group B is selected.

Else, UE initiates 4-step RA for resuming connection (small data is not included).

This option can be generalized wherein gNB configures the parameters MsgA-PUSCH-Config-SDT-group1 to MsgA-PUSCH-Config-SDT-groupN, and preambles for group 1 to N.

If the message size (UL data available for transmission plus MAC header and, where required, MAC control elements) is less than equal to the TB size of MsgA payload according to MsgA-PUSCH-Config-SDT-group1: UE performs small data transmission using 2-step RA. Group 1 is selected.

Else if the message size (UL data available for transmission plus MAC header and, where required, MAC control elements) is less than equal to the TB size of MsgA payload according to MsgA-PUSCH-Config-SDT-group2. UE performs small data transmission using 2-step RA. Group 2 is selected.

Else if the message size (UL data available for transmission plus MAC header and, where required, MAC control elements) is less than equal to the TB size of MsgA payload according to MsgA-PUSCH-Config-SDT-group3. UE performs small data transmission using 2-step RA. Group 3 is selected.

Else if the message size (UL data available for transmission plus MAC header and, where required, MAC control elements) is less than equal to the TB size of MsgA payload according to MsgA-PUSCH-Config-SDT-groupN. UE performs small data transmission using 2-step RA. Group N is selected.

Else: UE initiates 2-step RA for resuming connection (small data is not included).

Note: separate msgA-DeltaPreamble could be configured per TBS in the above procedure.

Criteria to Determine Whether to Use Preconfigured PUSCH Resource for SDT or not The UE can perform SDT using preconfigured PUSCH resource if all of the following conditions are met.

Condition 1: the upper layers request resumption of an RRC connection. The resumption request is for mobile originating calls, and the establishment cause is mo-Data;

Condition 2: the UE supports SDT;

Condition 3: Preconfigured PUSCH resources are signaled in RRCRelease message with suspend indication during the preceding suspend procedure, and UE is in same cell from which it has received Preconfigured PUSCH resources;

Condition 4: UE has a stored value of the nextHopChainingCount provided in the RRCRelease message with suspend indication during the preceding suspend procedure: and Condition 5: If the LCH restrictions for LCP are applied for SDT and all LCHs for which data is available for transmission is allowed to be multiplexed in MAC PDU for Preconfigured PUSCH resource for SDT according to LCH restrictions.

Note: Network can also indicate the DRBs for which SDT is allowed. In this case, in Condition 5, LCHs corresponding to the DRBs for which SDT is allowed is considered. If data is available for transmission for DRBs other than DRBs for which SDT is allowed, UE shall initiate connection resume without SDT. In an embodiment, Condition 5 is not used for determining SDT or not.

Condition 6: UE has a valid TA value.

Network configures SDT-TimeAlignmentTimer. The SDT-TimeAlignmentTimer is started upon receiving the SDT-TimeAlignmentTimer configuration from network. When a Timing Advance Command MAC control element is received or PDCCH indicates timing advance adjustment, the SDT-TimeAlignmentTimer is restarted.

If SDT-TimeAlignmentTimer is running; and if the SS-RSRP of pathloss reference has not increased by more than rsrp-IncreaseThresh since the last time SDT-TimeAlignmentTimer was started; and if the SS-RSRP of the pathloss reference has not decreased by more than rsrp-DecreaseThresh since the last time SDT-TimeAlignmentTimer was started: TA is considered valid.

Condition 7: UE has at least one SSB with SS-RSRP above a threshold, among the SSBs associated with Preconfigured PUSCH resources for UL carrier selected for SDT using Preconfigured PUSCH resources. If the RSRP of the downlink pathloss reference is less than rsrp-ThresholdSSB-SUL, SUL is selected for SDT using Preconfigured PUSCH resources. Otherwise, NUL is selected for SDT using Preconfigured PUSCH resources. In an embodiment, Condition 7 is not used for determining SDT or not.

Condition 8: If the size of MAC PDU to be transmitted is less than or equal to TBS of Preconfigured PUSCH resource. Note that multiple TBS size and criteria to select can be same as defined in 2-step RA.

Figure 2:
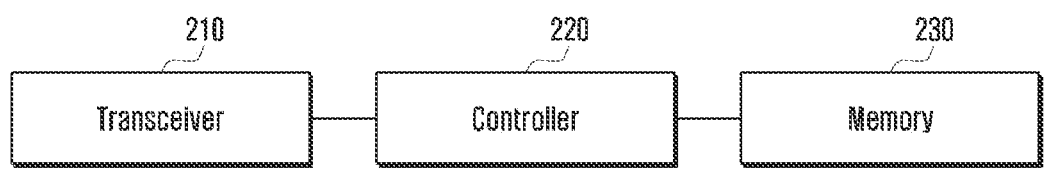
FIG. 2 is a block diagram of a terminal according to an embodiment of the disclosure.

FIG. 2 is a block diagram of a terminal according to an embodiment of the disclosure.

Referring to FIG. 2, a terminal includes a transceiver 210, a controller 220 and a memory 230. The controller 220 may refer to a circuitry, an application-specific integrated circuit (ASIC), a field programmable gate array (FPGA), or at least one processor. The transceiver 210, the controller 220, and the memory 230 are configured to perform the operations of the UE illustrated elsewhere in FIG. 1, or as otherwise described above. Although the transceiver 210, the controller 220, and the memory 230 are shown as separate entities, they may be integrated onto a single chip. The transceiver 210, the controller 220, and the memory 230 may also be electrically connected to or coupled with each other.

The transceiver 210 may transmit and receive signals to and from other network entities, e.g., a base station or another terminal.

The controller 220 may control the UE to perform functions according to the embodiments described above. For example, the controller 220 is configured to control the transceiver 210 to receive an RRC release message with suspend configuration from a base station. In response to the RRC release message, the controller 220 controls the terminal to enter an RRC inactive state. The controller 220 is configured to control the transceiver 210 to transmit an RRC resume request message to the base station during the RRC inactive state. The controller 220 is configured to identify whether criteria for SDT are met. In an embodiment, the controller 220 may be configured to identify whether information on a timer for SDT is received in the RRC release message or SIB1 to determine whether to start a timer for SDT. In an embodiment, if the criteria for SDT are met and the information on the timer for SDT is received, the controller 220 may be configured to start the timer for SDT based on the information on the timer for SDT upon initiation of SDT procedure. In an embodiment, if the criteria for SDT are met but the information on the timer for SDT is not received, the controller 220 may be configured to start the timer for SDT based on a default value of the timer for SDT upon initiation of SDT procedure. Upon the timer for SDT is expired, the controller 220 may be configured to control the terminal to enter an RRC idle state and perform a cell selection, or reinitiate an RRC resume procedure for SDT. The controller 220 may be configured to stop the timer for SDT upon reception of an RRC resume message, an RRC setup message, an RRC release message, or an RRC rejection message.

In an embodiment, the operations of the terminal may be implemented using the memory 230 storing corresponding program codes. Specifically, the terminal may be equipped with the memory 230 to store program codes implementing desired operations. To perform the desired operations, the controller 220 may read and execute the program codes stored in the memory 230 by using a processor or a central processing unit (CPU).

Figure 3:
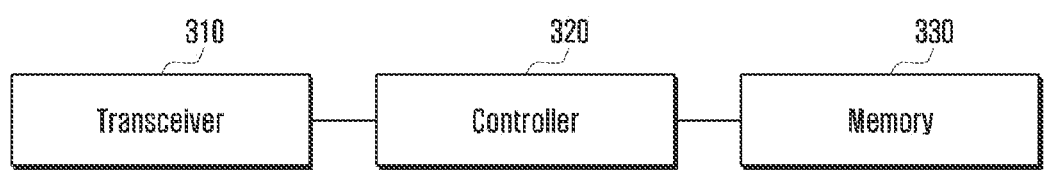
FIG. 3 is a block diagram of a base station according to an embodiment of the disclosure.

FIG. 3 is a block diagram of a base station according to an embodiment of the disclosure.

Referring to FIG. 3, a base station includes a transceiver 310, a controller 320, and a memory 330. The controller 320 may refer to a circuitry, an ASIC, an FPGA, or at least one processor. The transceiver 310, the controller 320, and the memory 330 are configured to perform the operations of the gNB illustrated elsewhere in the figures, or as otherwise described above. Although the transceiver 310, the controller 320, and the memory 330 are shown as separate entities, they may be integrated onto a single chip. The transceiver 310, the controller 320, and the memory 330 may also be electrically connected to or coupled with each other.

The transceiver 310 may transmit and receive signals to and from other network entities, e.g., a terminal.

The controller 320 may control the gNB to perform functions according to the embodiments described above.

In an embodiment, the operations of the base station may be implemented using the memory 330 storing corresponding program codes. Specifically, the base station may be equipped with the memory 330 to store program codes implementing desired operations. To perform the desired operations, the controller 320 may read and execute the program codes stored in the memory 330 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal for small data transmission (SDT) in a wireless communication system, the method comprising:
   receiving, from a base station, a radio resource control (RRC) release message with suspend configuration in an RRC CONNECTED;
   entering an RRC INACTIVE in response to the RRC release message;
   receiving, from the base station, system information including information on a timer associated with the SDT;
   during the RRC INACTIVE, transmitting, to the base station, an RRC resume request message for an RRC resume procedure;
   identifying the RRC resume procedure being initiated for the SDT based on criteria for SDT; and
   starting the timer associated with the SDT based on the RRC resume procedure being initiated for the SDT.

2. The method of claim 1, further comprising:
   stopping the timer associated with the SDT based on a reception of an RRC resume message.

3. The method of claim 1, further comprising:
   receiving, from the base station, system information including information on a timer 319; and
   starting the timer 319 based on the RRC resume procedure being not initiated for the SDT.

4. The method of claim 1, further comprising:
   when the timer associated with the SDT expires,
   resetting a medium access control (MAC) entity;
   setting a variable associated with a pending radio access network (RAN)-based notification area (RNA) update to false, based on the variable being set to true;
   discarding a user equipment (UE) inactive access stratum (AS) context;
   releasing information on a suspend configuration;
   discarding at least one security key;
   releasing all radio resources; and
   entering an RRC IDLE and performing a cell selection.

5. The method of claim 1, further comprising:
   identifying whether a pre-configured uplink resource is configured for the SDT; and
   performing the SDT based on the pre-configured uplink resource, based on the pre-configured uplink resource being configured for the SDT.

6. The method of claim 5, further comprising:
   transmitting the RRC resume request message based on the RRC resume procedure being initiated for the SDT, based on the pre-configured uplink resource being not configured for the SDT.

7. A terminal for small data transmission (SDT) in a wireless communication system, the terminal comprising:
   a transceiver; and
   at least one processor coupled with the transceiver and configured to:
      receive, from a base station via the transceiver, a radio resource control (RRC) release message with suspend configuration in an RRC CONNECTED,
      enter an RRC INACTIVE in response to the RRC release message,
      receive, from the base station via the transceiver, system information including information on a timer associated with the SDT,
      during the RRC INACTIVE, transmit, to the base station via the transceiver, an RRC resume request message for an RRC resume procedure,
      identify the RRC resume procedure being initiated for the SDT based on criteria for SDT, and start the timer associated with the SDT based on the RRC resume procedure being initiated for the SDT.

8. The terminal of claim 7, wherein the at least one processor is further configured to:
   stop the timer associated with the SDT based on a reception of an RRC resume message.

9. The terminal of claim 7, wherein the at least one processor is further configured to:
   receive, from the base station via the transceiver, system information including information on a timer 319, and
   start the timer 319 based on the RRC resume procedure being not initiated for the SDT.

10. The terminal of claim 7, wherein the at least one processor is further configured to:
    when the timer associated with the SDT expires,
    reset a medium access control (MAC) entity,
    set a variable associated with a pending radio access network (RAN)-based notification area (RNA) update to false, based on the variable being set to true,
    discard a user equipment (UE) inactive access stratum (AS) context,
    release information on a suspend configuration,
    discard at least one security key,
    release all radio resources, and
    enter an RRC IDLE and perform a cell selection.

11. The terminal of claim 7, wherein the at least one processor is further configured to:
    identify whether a pre-configured uplink resource is configured for the SDT, and
    perform the SDT based on the pre-configured uplink resource, based on the pre-configured uplink resource being configured for the SDT.

12. The terminal of claim 11, wherein the at least one processor is further configured to:
    transmit the RRC resume request message based on the RRC resume procedure being initiated for the SDT, based on the pre-configured uplink resource being not configured for the SDT.

* * * * *